United States Patent
Cualing et al.

(10) Patent No.: US 9,607,372 B2
(45) Date of Patent: Mar. 28, 2017

(54) AUTOMATED BONE MARROW CELLULARITY DETERMINATION

(76) Inventors: Hernani D. Cualing, Lutz, FL (US); Eric Zhong, East Brunswick, NJ (US)

( * ) Notice: Subject to any disclaimer, the term of this patent is extended or adjusted under 35 U.S.C. 154(b) by 747 days.

(21) Appl. No.: 12/668,628

(22) PCT Filed: Jul. 11, 2008

(86) PCT No.: PCT/US2008/069896
§ 371 (c)(1),
(2), (4) Date: Jun. 21, 2010

(87) PCT Pub. No.: WO2009/009779
PCT Pub. Date: Jan. 15, 2009

(65) Prior Publication Data
US 2010/0254588 A1    Oct. 7, 2010

Related U.S. Application Data

(60) Provisional application No. 60/958,975, filed on Jul. 11, 2007.

(51) Int. Cl.
*G06K 9/00* (2006.01)
*G06T 7/00* (2017.01)

(52) U.S. Cl.
CPC .......... *G06T 7/0012* (2013.01); *G06K 9/0014* (2013.01); *G06T 2207/10056* (2013.01); *G06T 2207/30024* (2013.01)

(58) Field of Classification Search
CPC ......... G06T 7/0012; G06T 2207/10056; G06T 2207/30024; G06K 9/0014

(Continued)

(56) References Cited

U.S. PATENT DOCUMENTS 5,692,220 A * 11/1997 Diamond et al. ............. 600/368
6,999,549 B2 * 2/2006 Sabol et al. .................. 378/5

(Continued)

OTHER PUBLICATIONS

Alasdair I. dow, Steven A. Shafer, John M. Kirkwood, Ruth A. Mascari, and Alan S. Waggoner; Automatic multiparameter Fluorescence Imaging for Determining Lymphocyte Phenotype and Activation Status in Melanoma Tissue Sections, Cytometry, vol. 25: pp. 71-81 (1996).*

(Continued)

*Primary Examiner* — Hiep V Nguyen
(74) *Attorney, Agent, or Firm* — James J. Sterling

(57) ABSTRACT

The invention determines cell to fat ratio statistic, applicable in the field of pathology, in a greatly improved manner over manual or prior art scoring techniques. The cellular areas are identified and displayed in an easy to read format on the computer monitor, printer output or other display means, with average cellularity, nuclear quantity distribution at a glance. These output data are an objective transformation of the subjective visible image that the pathologist or scientist relies upon for diagnosis, prognosis, or monitoring therapeutic perturbations. The invention uses multi-stage thresholding and segmentation algorithms in RGB and HSB spaces, auto-thresholding on red and blue channels in RGB to get the raw working image of all cells, then refines the working image with thresholding on hue and intensity channels in HSB using an adaptive parameter epsilon in entropy mode, and further separates different groups of cells within the same class, by auto-thresholding within the working image region.

6 Claims, 13 Drawing Sheets

(58) Field of Classification Search
USPC .......................................................... 382/133
See application file for complete search history.

(56) References Cited

U.S. PATENT DOCUMENTS

| | | | |
|---|---|---|---|
| 7,049,137 B2* | 5/2006 | Jegla | 435/325 |
| 7,359,548 B2* | 4/2008 | Douglass et al. | 382/162 |
| 2006/0127881 A1* | 6/2006 | Wong et al. | 435/4 |

OTHER PUBLICATIONS

Ciril Rozman, Joan-Caries Reverter, Evarist Feliu, Lluis Berge, Maria Rozman, and Carme Climent; Variation of Fat Tissue Fraction in Abnormal Human Bone Marrow Depend Both on Size and Number of Adipocytes: A Stereologic Study; 1990, The American Society of Hematology, vol. 76, No. 5 (Dec. 1), p. 892-895.*

* cited by examiner

AUTOMATED BONE MARROW CELLULARITY DETERMINATION

CLAIM OF PRIORITY

This application claims the benefit of U.S. Provisional Application Ser. No. 60/958,975 filed on Jul. 11, 2007 and entitled "Automated Bone Marrow Cellularity Determination," the content of which is herein incorporated by reference in its entirety.

FEDERALLY SPONSORED RESEARCH

Not Applicable.

PARTIES TO A JOINT RESEARCH AGREEMENT

Not Applicable.

TECHNICAL FIELD

The invention relates generally to a system for automated light microscopic image analysis, specifically to computerized methods of determining the cellularity of the bone marrow by obtaining the cell to fat ratio.

BACKGROUND OF INVENTION

Introduction

Bone marrow biopsy is performed in a number of health and cancer related work to determine the dissemination status of a solid tumor; the cause of anemia, the determination of leukemia or lymphoma and the monitoring of response to treatment.

Determining bone marrow cellularity is often a subjective estimation with great interobserver variation. A rapid, accurate, reproducible method would be desirable for pathologists who regularly examine bone marrow biopsies.

The optical microscope in the diagnostic and biomedical laboratory is routinely used by pathologists and research scientist to make diagnosis and perform experiments. These users perform these functions by visualizing cells and tissue sections that have been previously prepared and chemically stained in the histology or histochemistry laboratory. Every patient with a tumor suspected of cancer undergoes evaluation and staging of the disease to determine if there is dissemination or systemic spread. The bone marrow biopsy is used to determine systemic disease. This bone marrow tissue is routinely fixed in formalin, processed in a tissue processor, embedded in formalin and serially cut in a microtome to give thin sections representing the diagnostic material.

The existing diagnosis is performed by examining the tissue optically using the objective lenses of the microscope in low and high power magnifications. The routinely stained hematoxylin and eosin tissue is examined first to visualize first in low power the overall bone marrow cellularity and an estimate is performed by the pathologist. This estimate is included in the report as part of the patient record. There is as yet no automated way to determine bone marrow cellularity using a robust, reproducible and objective manner. Crucial clinical decisions are made on this subjective interpretation of the bone marrow cellularity. The information is used for determining diagnosis, treatment response and monitoring and exclusion or inclusion in certain clinical therapeutic protocols.

The routinely stained hematoxylin and eosin tissue is examined and the overall bone marrow cellularity is estimated by the pathologist. The latter practice is the standard of practice, not because it is the optimal way, but because of an absence of an automated bone marrow cellularity measuring tool associated with the microscope. This practice is subjective, error prone, and often gives wide range of results that depends on the level of microscopist's skill.

Using advance segmentation algorithm employed in the present invention, chromogen-marked microscopic bone marrow digitized images are automatically evaluated and results projected for the pathologists within a short period of time with minimal variance and great reproducibility regardless of the type of stain; hematoxylin and eosin ('H&E') or Periodic Acid Schiff ('PAS'). Accordingly, the results are highly correlated with the pathologists as set forth in the detailed embodiment.

The present invention further performs a series of biopsies stained with routine H&E or PAS and their corresponding images were used to generate the validation data. The results are useful, rapid and accurate way to extract bone marrow cellularity and provide a cell to fat ratio. An accurate, rapid measurement of bone marrow cellularity would be beneficial to practicing pathologists.

Prior Art

U.S. Publication No. 20070020697 published on Jan. 25, 2007 to Cualing et al. reveals an automated method of single cell image analysis which determines cell population statistic, applicable in the field of pathology, disease or cancer diagnosis, in a greatly improved manner over manual or prior art scoring techniques. This invention does not provide an algorithm for determining bone marrow cellularity result which provides a fat to cell ratio.

U.S. Publication No. 20060280352 published on Dec. 14, 2006 to Bryan et al. reveals a computer-implemented method for analyzing images which may include quantitatively analyzing image data to identify image objects relative to a background portion of the image according to predefined object criteria, the image data including a plurality of image objects that represent objects in a sample distributed across a substrate. The identified image objects are further clustered into groups or colonies of the identified image objects according to predetermined clustering criteria. However, the method is applicable only to bone marrow cultured cells and stroma on culture dishes used in a laboratory and experimental setup, and not in a daily pathology diagnostic practice as intended by the present invention. Moreover, no output like a cell to fat ratio or quantitative immunohistochemistry is used by this invention; therefore, no cellularity result is determined.

WIPO Publication No. 2007080583 published on Jul. 19, 2007 to Kolatt et al. reveals methods, computer readable storage media and systems which can be used for analyzing labeled biological samples, identifying chromosomal aberrations, identifying genetically abnormal cells and/or computationally scanning the samples using randomly or randomized scanning methods; wherein, said samples comprises a tissue biopsy from a bone marrow sample. This invention does not provide any thresholding and segmentation algorithms, and morphometric image analysis for determining bone marrow cellularity and does not provide a cell to fat ratio output.

U.S. Publication No. 20020067858 published on Jun. 6, 2002 to Lazaridis reveals a system, process, and computer program product for extracting quantitative summaries of information from digital images which includes performing a first image analysis and one or more additional image analyses. This invention does not disclose any thresholding and segementation algorithm to provide cellularity results for a bone marrow tissue through a cell to fat ratio output.

Nilsson et al., in the publication entitled, "Segmentation of Complex Cell Clusters in Microscopic Images: Application to Bone Marrow Samples," published in Cytometry, volume 66(1), pages 24-31 on July 2005, presents an algorithm that enables image analysis-based analysis of bone marrow samples for the first time and may also be adopted for other digital cytometric applications where separation of complex cell clusters is required. This microscopic image analysis deals not with tissue or bone marrow tissue section but with clusters of bone marrow cells smeared on a microscopic slide. Algorithm optimizes declustering of the cells of bone marrow smear or cytologic preparation which tend to form large clusters when prepared in the laboratory. No output like a cell to fat ratio is provided therein, hence, it does not provide a bone marrow cellularity result.

DEFINITIONS OF TERMS

A digital image is defined for the purposes of describing the invention as a two-dimensional collection of points with intensity I (x,y) at coordinates (x,y). Color images are replaced with color RGB(x, y) at coordinates (x, y).

A histogram of a picture is a plot of intensity or color versus the frequency of occurrence. The range of intensity of a picture is often small compared to the range available on a system. The global real color image is the ground truth that is referenced by the user to collect histogram characteristics—which generally fall into bimodal or multimodal categories. The multimodal categories of global image lends itself a type of histogram thresholding mode usually by entropy parameter while the isodata parameter worked better with bimodal histograms.

Mathematical morphology is an approach to image processing which is based on the shape of the objects processed. Haralick et al. described in "Image Analysis Using Mathematical Morphology", but the equations have been reformulated based on Boolean arithmetic instead of set arithmetic to facilitate the conversion to computer programs. The following logical operations are used: OR, AND, EXOR for binary images. Dilation is an operation that spreads out the marked pixels and has the effect of reducing noise and filling small holes. Erosion is an operation that contracts the marked pixels and has the effect of thinning the object and expanding holes. The most common dilation and erosion operations have as input an image and a structuring element known as the dilation or erosion mask. The shape of the structuring element known as the dilation or erosion mask depends on the application. Dilation and erosion are often performed in pairs.

Objects Operations and Counting ('OOC') usually refers to the techniques of locating marked objects and obtaining information about them. Assume that the pixels in the objects all have value 1 and the background pixels all have value 0. The technique for locating the objects is well known and uses region of interest and the corresponding identified objects represented by bitplanes, masks, or binary objects. The previously processed binary image is scanned until an object pixel (which is the starting pixel for boundary tracing) is encountered.

Hue singularity where the hue and saturation is undefined when RGB=1 or 0, i.e., the darkest and brightest spots, respectively. Many systems fail without removing singularities.

Gray-value morphological processing using iterative Isodata technique was developed by Ridler and Calvard and has appealing functionality in their relative insensitivity to brightness or darkness range of the histogram, but is readily influenced by the histogram shape.

ISODATA mode is an automated method. The histogram is initially segmented into two regions using a starting threshold value such as the half the maximum dynamic range. The sample mean associated with the background and foreground pixels are computed for the gray value. A new threshold value is computed as the average of these two sample means. The process is then repeated, until the threshold value does not change anymore. After the algorithm is applied, the population of interest is separated. In our example, we applied this principle to color images, and when the histogram is based on the degree of brown staining or lack thereof, the positive and negative cells are separated as two binary objects.

Gray-value morphologic processing using the entropy thresholding technique was developed by Johannsen G, Bille J. Entropy algorithm is an automated mode that dynamically adjust to the image histogram distribution but is likewise relatively insensitive to the brightness range. The method divides the histogram into two part, minimizing the interdependence between two parts, measured in terms of entropy. The grey level that performs this division will be the threshold value. As a condition, the user may specify the fraction of the image that minimally should be assigned to be a foreground object. The algorithm then searches for the minimal entropy within this constraint. In our example, we applied this principle to color images, and when the histogram is based on the degree of brown staining or lack thereof, the positive and negative cells are separated as two binary objects, with the added bonus of an adaptive parameter in the form of the fraction epsilon.

Bitplane sculpting: In both these isodata and entropy modes, the user specifies the part of the image to consider for the computation of the histogram. In our example, the parts of the image pre-processed by RGB is used, then the intersection of these images are used, then the resulting region of interest are transformed to different color value, and the thresholding is applied to these narrower tier of images. The result of the thresholding operation is stored in one of a number of bitplane images used in bitplane sculpting operations and the value is also stored and accessible.

SUMMARY OF THE INVENTION

The invention provides an automated method of bone marrow cellularity image analysis which determines cell to fat ratio statistic, applicable in the field of pathology, disease or cancer diagnosis, in a greatly improved manner over manual or prior art scoring techniques. By combining the scientific advantages of computerized automation and the invented method, as well as the greatly increased speed with which population can be evaluated, the invention is a major improvement over methods currently available. The cellular areas are identified and displayed in an easy to read format on the computer monitor, printer output or other display means, with average cellularity and nuclear quantity distribution at a glance. These output data are an objective transformation of the subjective visible image that the pathologist or scientist relies upon for diagnosis, prognosis, or monitoring therapeutic perturbations. Using our novel proposed technology, we combine the advantages provided by computerized technique to automatically determine bone marrow cellularity. To accomplish this aim, we resort to new and improved advanced image analysis using a unique, useful, and adaptive process as described herein, which results in a new paradigm that is both useful, novel, and provides objective tangible result from a complex color image of tissue.

BRIEF DESCRIPTION OF THE DRAWINGS

The teachings of the present invention use references that will hereinafter be made in conjunction with the accompanying drawings wherein like reference numerals throughout the various FIGURES denote like structural elements, and wherein.

DETAILED DESCRIPTION OF THE PREFERRED EMBODIMENTS

Figure 1:
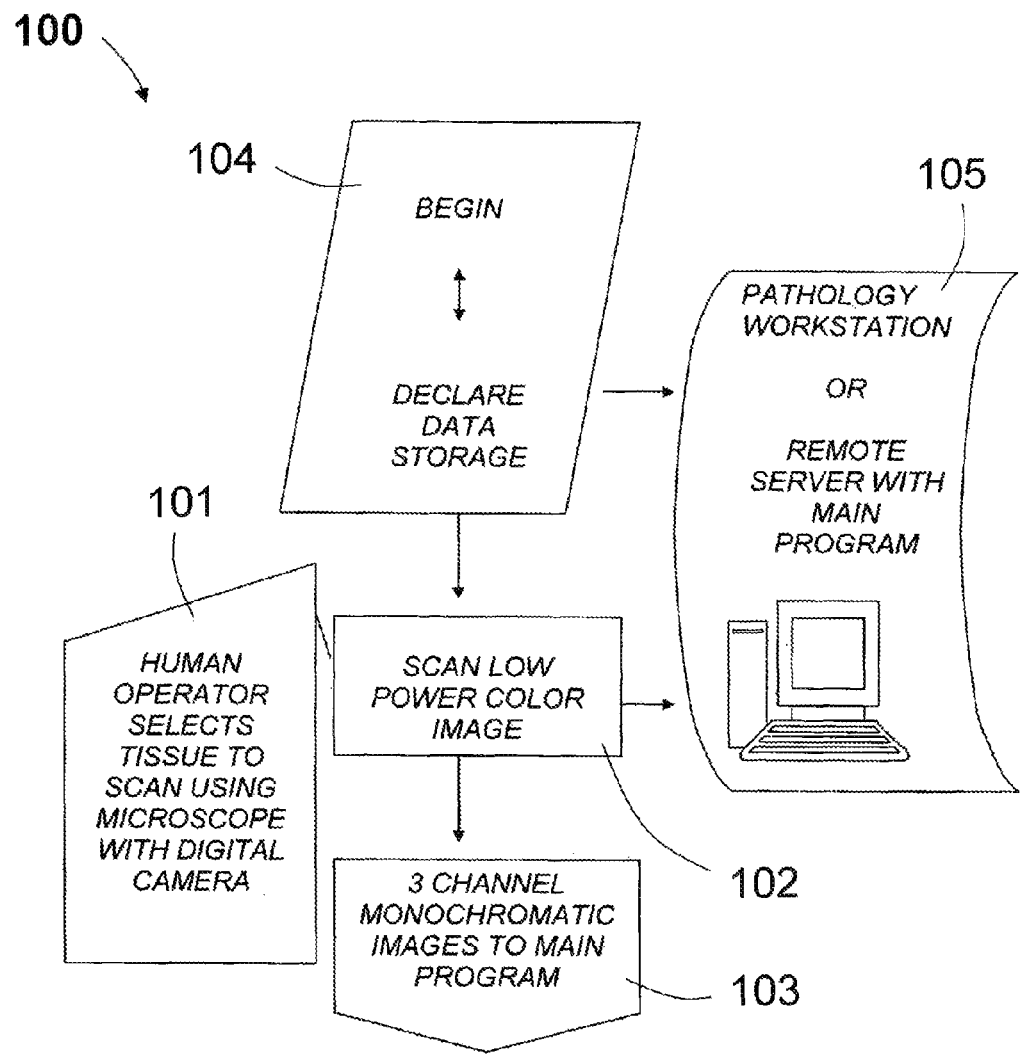
FIG. 1 shows the exemplary block diagram desirably needed to accomplish the automated method of bone marrow cellularity determination of the present invention.

The features of the present invention which are believed to be novel are set forth with particularity in the appended claims. The structure and mode of operation of the present invention is further elucidated in the following descriptions, relating to the accompanying drawings, to with:

Referring to FIG. 1, there is shown a block diagram 100 of the interface of the system. The system includes a human operator or an automated slide delivery system, to place and select the tissue to scan (block 101) for low power color image (block 102). The image is scanned of a three-channel RGB monochromatic planes which are sent to the main program (block 103). The main program and its declared data storage (block 104) are in preferably a pathology workstation with monitor display or alternatively located in a remote server (block 105).

A general purpose computer, preferably a personal computer ("PC"), may control the operation of the image processor. The image processor board preferably a Pentium with PCI bus advanced chip, running Windows 9× or greater or a PowerPC with PCI bus running OS 8.5 or greater and able to run executable programs. The frame memory of the image processor is memory mapped to the PC which performs most of the complicated computations that the image processor cannot handle. This includes searching and other operations requiring random access of the frame memory. With careful planning, the image processor can perform selected functions in parallel with the computer. The use of a PC also facilitates the transfer of data to other software packages that are readily available. The user interacts with the computer via a keyboard and a mouse. An industry standard interface circuit and ports with software to connect to the internet is preferred. The output device is provided to allow the user to view the data and the results obtained. A graphics color monitor and printer capable of displaying the entire video frame is required.

Figure 2:
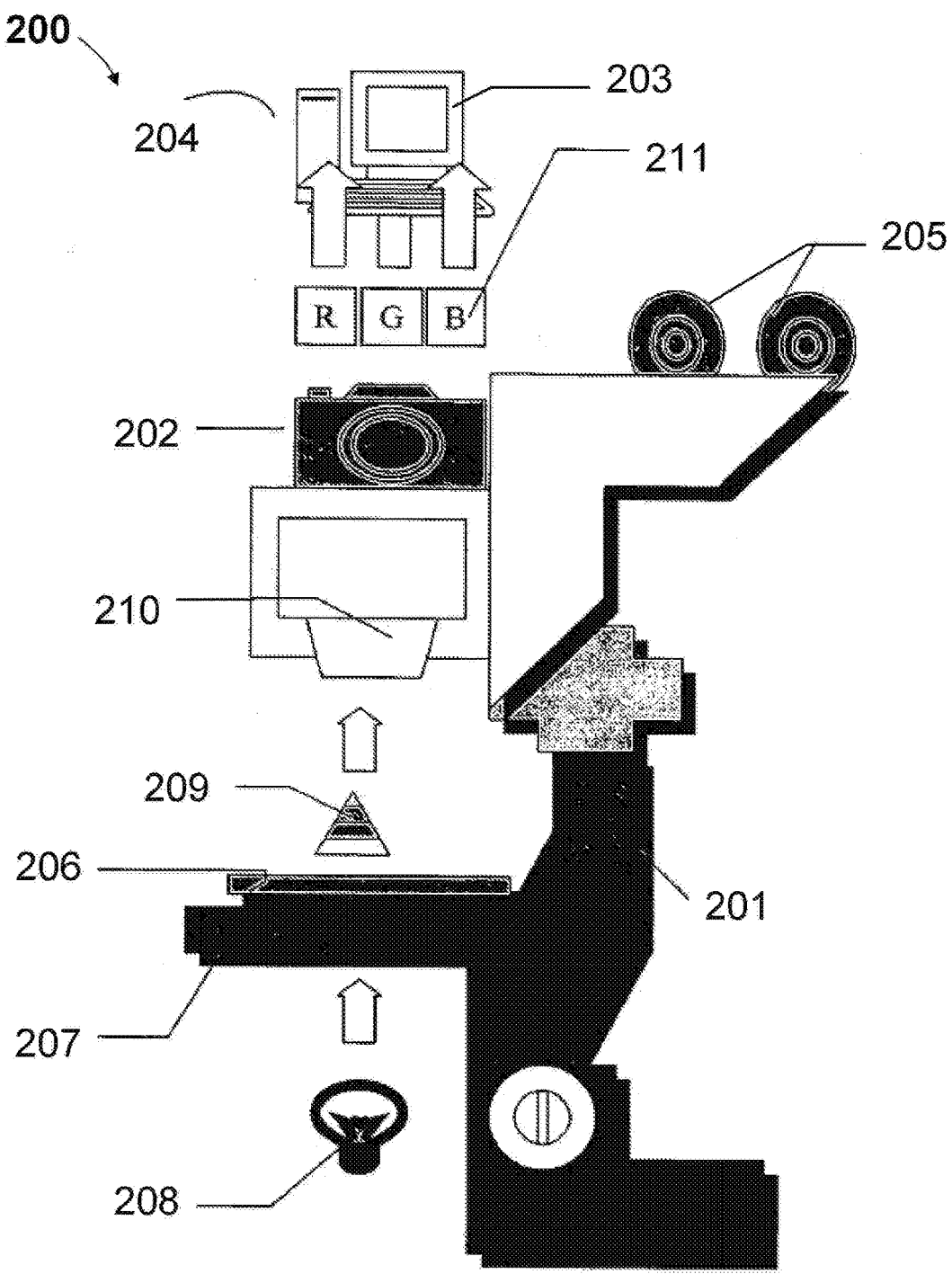
FIG. 2 shows the exemplary hardware components including microscope, CCD camera, and digital image obtained from bone marrow tissue on microscopic slide.

Referring to FIG. 2, there is illustrated a representation diagram 200 showing a microscope 201, a color CCD camera 202, a general purpose computer or PC 203 equipped with a special purpose image processing board, and an output device 204 such as graphics monitor which may have a connection to printer for producing hard output. Each of the different components will be discussed in greater detail below.

The trinocular microscope 201 is equipped with set of eyepiece objectives 205 for the human operator to visualize the image obtained from microscopic slide 206 on stage 207 and illuminated by a stable light source 208. The operator focuses the slide view wherein the white spectrum of visible transmitted light image 209 is on focal plane of the eyepieces field of view located above 205 and on the imaging plane of the camera 202. The microscope 201 is still equipped with a plurality of objective lenses 210 to perform a plurality of magnifications; with 20 times objective the preferred embodiment because of optimal level of cell detail obtainable with this objective magnification. The image from the CCD camera 202 is funneled in three channels representing the red, green, and blue (RGB) monochromatic image planes 211, respectively.

The camera 202 is directly connected to a regular trinocular microscope 201 via an optical tube (not illustrated)

such as a trinocular head, and in alignment with the optical path of the transmitted image of the tissue on slide 206 thru the set of two objectives 205 which is also an integral part of the trinocular head. The camera 202 is preferably a three-channel CCD RGB camera with separate outputs into three channels corresponding to red, green, and blue monochrome images. Preferably, the sample image could be saved as 24-bit depth in RGB color. A CCD chip with a three-channel 1600×1200 active pixels (1.2 million) CCD (Charge-Coupled Device) with 7.4 um square pixels KAI as sold by Diagnostic Instruments. The bit depth is sampled at 30 bit RGB and could be saved as 24-bit or more for enhanced sampling of details. The overall operation of CCD equipped cameras is well known in the art. The camera image could be saved as 512×474 pixels or any other predetermined spatial format to be used in the analysis.

The output of the camera 202 is digitized and stored for reference and manipulations. This task is accomplished by an image processor board contained within the general purpose computer 204. Alternatively, the image processor capable of supporting 24-bit RGB of the desired monitor, can take the form of a separate unit coupled to the general purpose computer 204. An image processor preferably is a single board, real-time image processor designed to be interfaced with IBM PC-AT's and compatibles, via a preferred PCI bus card, although other image processing devices may be readily employed. The image processor could at least digitize 512×474 pixel images from the camera with 8-bit precision (256 gray levels) per channel. The video card software driver should be capable of saving images in a plurality of standard image file formats, including TIFF, JPEG, PICT and others.

Figure 3:
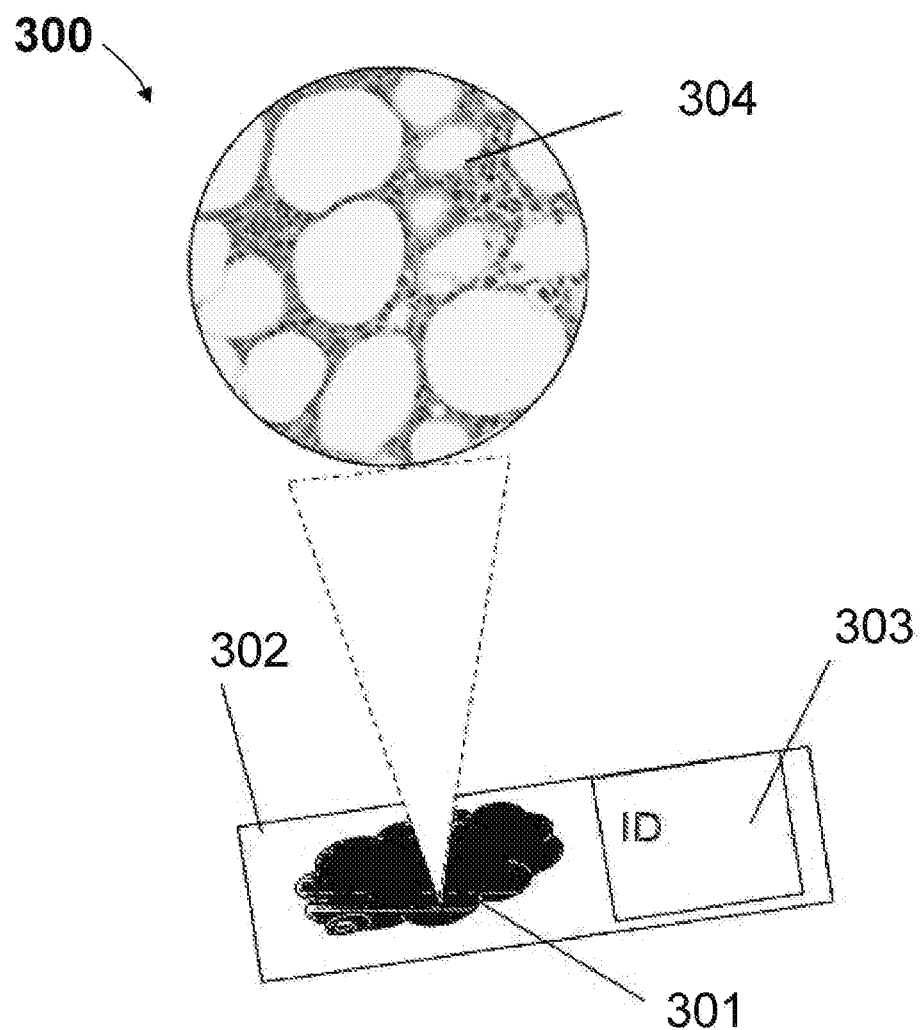
FIG. 3 shows the exemplary bone marrow tissue on microscopic slide and the magnified microscopic image of cells depicted as tangential three dimensional cut sections of variable sizes corresponding to a single-cell object events.

Referring to FIG. 3, there is shown the illustration 300 comprising the tissue 301 and slide component 302. Current algorithms aim to extract a precise cell boundary for mensuration especially relevant in cytologic images. Given that the cell boundary in tissue section is already artifactually chopped into cell tangents and is partly representative of the whole cell, the issue of accurate edges is answered in practical way. Still in FIG. 3, slide component 302 contain on its surface a cut section of tissue 301 identified as belonging to a patient identified by ID 303. The projected microscopic color image 304, visible in previously mentioned microscope objectives and monitor, displays the blue and the brown cell objects of interest. In reality, given enough circular samples from a spherical form of a cell, the modal maximal diameter value should represent the actual diameter. We differ from previous art, such as those that are imaging cytology and therefore whole cell on slides, by considering these diameters as events but more similar to flow cytometry cell events.

Figure 4A:
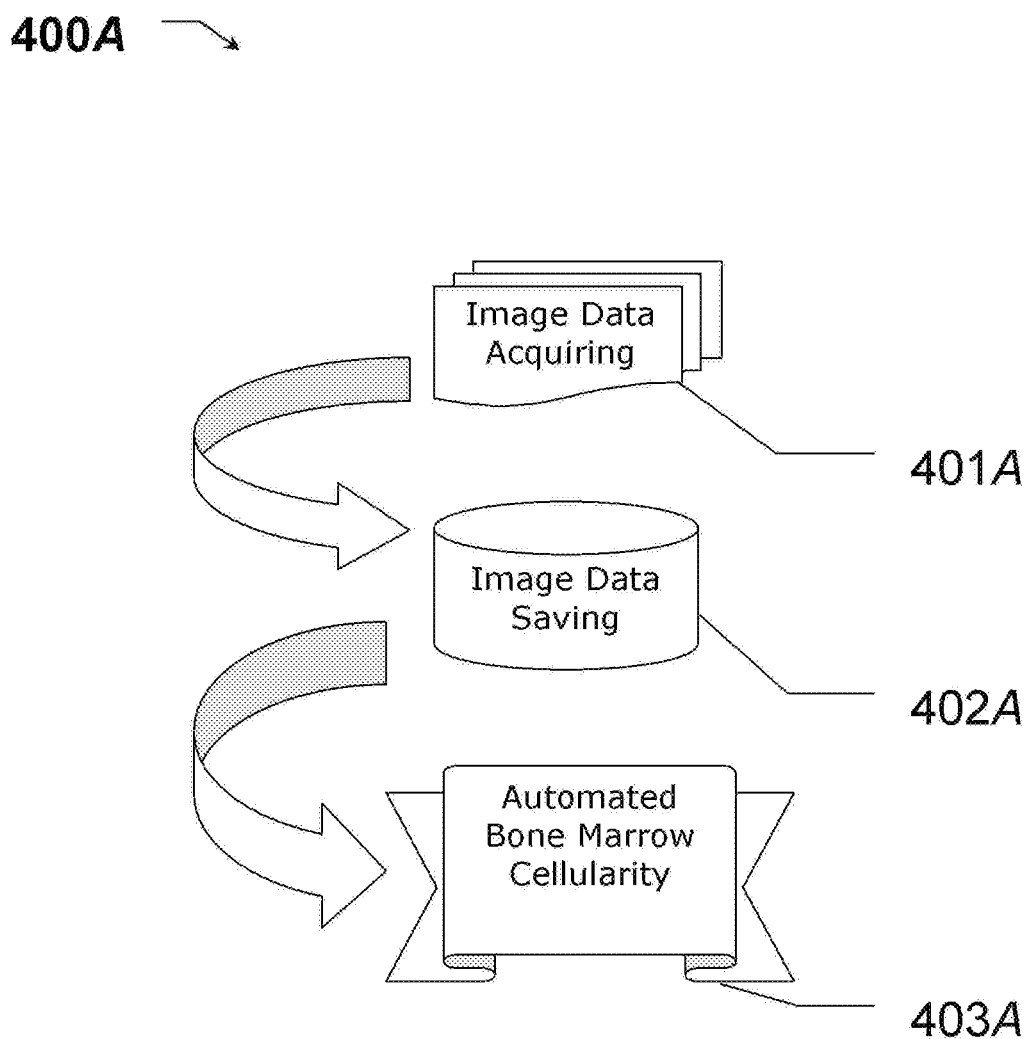
FIG. 4A shows the exemplary process that can be employed, in an automated fashion, to implement automated bone marrow cellularity determination.

Referring to FIG. 4A, depicted is an example of a process 400A that can be exemplarily employed, in an automated fashion, to implement automated bone marrow cellularity determination. Operation 401A is acquiring image data which utilizes image acquisition devices such as depicted in FIG. 2 and FIG. 3. Operation 402B is saving image data in a data storage device which can either be located physically close to where operation 401A is performed, or remotely by connecting to a network. Operation 403A is automated image processing for bone marrow cellularity in a computer system which can either be located physically close to the image data storage device being used in operation 402B, or remotely by connecting to a network.

Figure 4B:
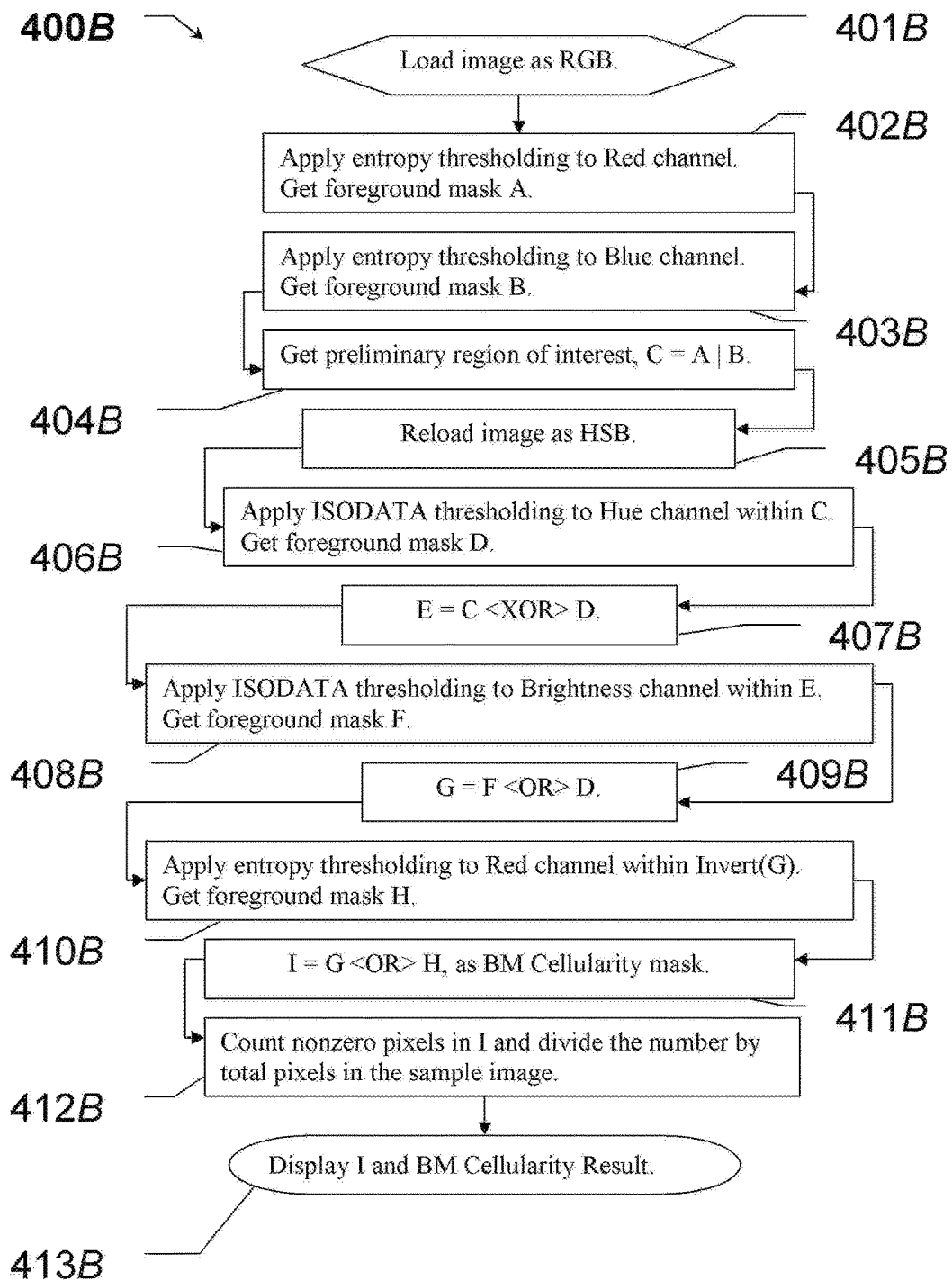
FIG. 4B shows the exemplary flowchart of the novel software algorithm intended to determine the cellularity, in an automated fashion, of the bone marrow tissue using HSB, as described with particularity to the preferred embodiment, and to the appended claims.

Referring now to FIG. 4B, depicted is an example of a method 400B that can be employed, in an automated fashion, such as in operation 403A to segment bone marrow cellularity of image data, such as shown at FIG. 3. Method 400B is an image data processing and analyzing algorithm which can be implemented as either computer hardware or software or a combination of both. Method 400B contains automated multi-stage image segmenting and morphological processing, numerical image data analyzing, and user interfacing.

At process 401B, an image subject to analysis is loaded into a computer memory separated into three distinct channels labeled as Red, Blue and Green channels.

At process 402B, entropy thresholding is applied to the image data using the Red channel pixels to segment foreground objects from the background and these foreground pixels are assigned to an intermediate mask labeled 'mask A'. As an example, objects in this mask represent all cells including cell nuclei that can be segmented from the background using an entropy threshold, using the gray level intensity threshold in the color channel being used. The gray level threshold can be employed for selecting objects within range of intensity levels, such as determined based on intensity values just above the peak level in a distribution of the image data (e.g., from a histogram) in the color channel being used.

At process 403B, entropy thresholding is applied to the image data using the Blue channel pixels to segment foreground objects from the background and these foreground pixels are assigned to an intermediate mask labeled 'mask B'.

At process 404B, 'mask A' and 'mask B' are combined using a logical <OR> operation and the result is assigned to an intermediate mask labeled as 'mask C'. 'Mask C' represents the preliminary region of interest for bone marrow cellularity and covers the nuclei over all the nonfat areas, as well as pale areas surrounding the nuclei.

At process 405B, Hue and Brightness channels are generated by either reloading sample image in HSB format or converting from existing RGB channels.

At process 406B, first the Hue channel is masked with 'mask C' and all pixels out of 'mask C' are removed. Then ISODATA thresholding is applied to the masked Hue channel pixels to segment foreground objects from the background and these foreground pixels are assigned to an intermediate mask labeled 'mask D'.

At process 407B, a logical <XOR> operation is applied to exclude 'mask D' region from 'mask C' and the result is saved in a intermediate mask labeled as 'mask E'.

At process 408B, first the Brightness channel is masked with 'mask E' and all pixels out of 'mask E' are removed. Then ISODATA thresholding is applied to the masked Brightness channel pixels to segment foreground objects from the background and these foreground pixels are assigned to an intermediate mask labeled 'mask F'.

At process 409B, 'mask D' and 'mask F' are combined using a logical <OR> operation and the result is assigned to an intermediate mask labeled as 'mask G'. 'Mask G'represents the primary region of interest for bone marrow cellularity and covers mainly the nuclei over all the nonfat areas.

At process 410B, first the Red channel is masked with 'mask G' and all pixels inside 'mask G' are removed. Then Entropy thresholding is applied to the masked Red channel pixels to segment foreground objects from the background and these foreground pixels are assigned to an intermediate mask labeled 'mask H'. A dynamic parameter epsilon as depicted in the succeeding embodiment of image processing method can be applied in selecting the entropy threshold. 'Mask H' covers minor nuclei areas missed in 'mask G'.

At process 411B, 'mask G' and 'mask H' are combined using a logical <OR> operation and the result is assigned to a bone marrow cellularity candidate mask labeled as 'Mask I'. 'Mask I' represents the region of interest for bone marrow cellularity and covers the nuclei over all the nonfat areas.

At process 412B, the total number of nonzero pixels in 'Mask I' is then counted and bone marrow cellularity percentage is then calculated by dividing the number of pixels in labeled objects by the total number pixels in the image.

Figure 5A:
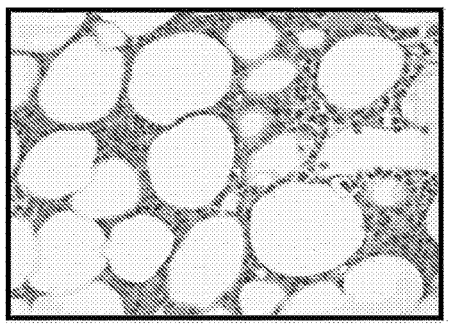
FIG. 5A and FIG. 5B show the raw tissue images of a bone marrow cytologically stained with hematoxylin and eosin.
Figure 5B:
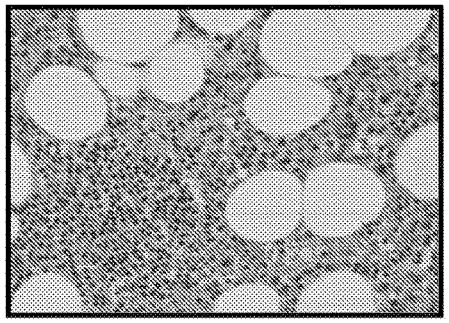
Figure 5C:
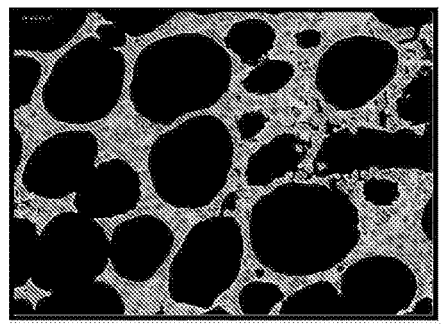
FIG. 5C and FIG. 5D show the corresponding cellularity result provided by the automated analysis of FIG. 5A and FIG. 5B, respectively.
Figure 5D:
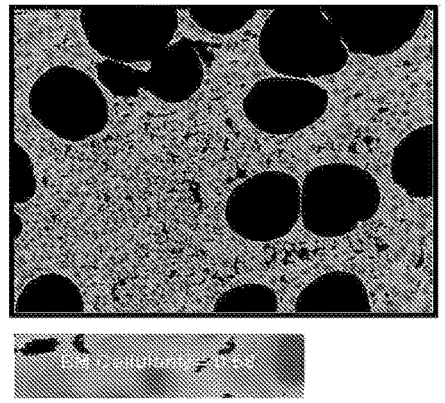

At process 413B, 'Mask I' with the calculated bone marrow cellularity result is displayed, such as depicted in FIG. 5C and FIG. 5D.

Figure 4C:
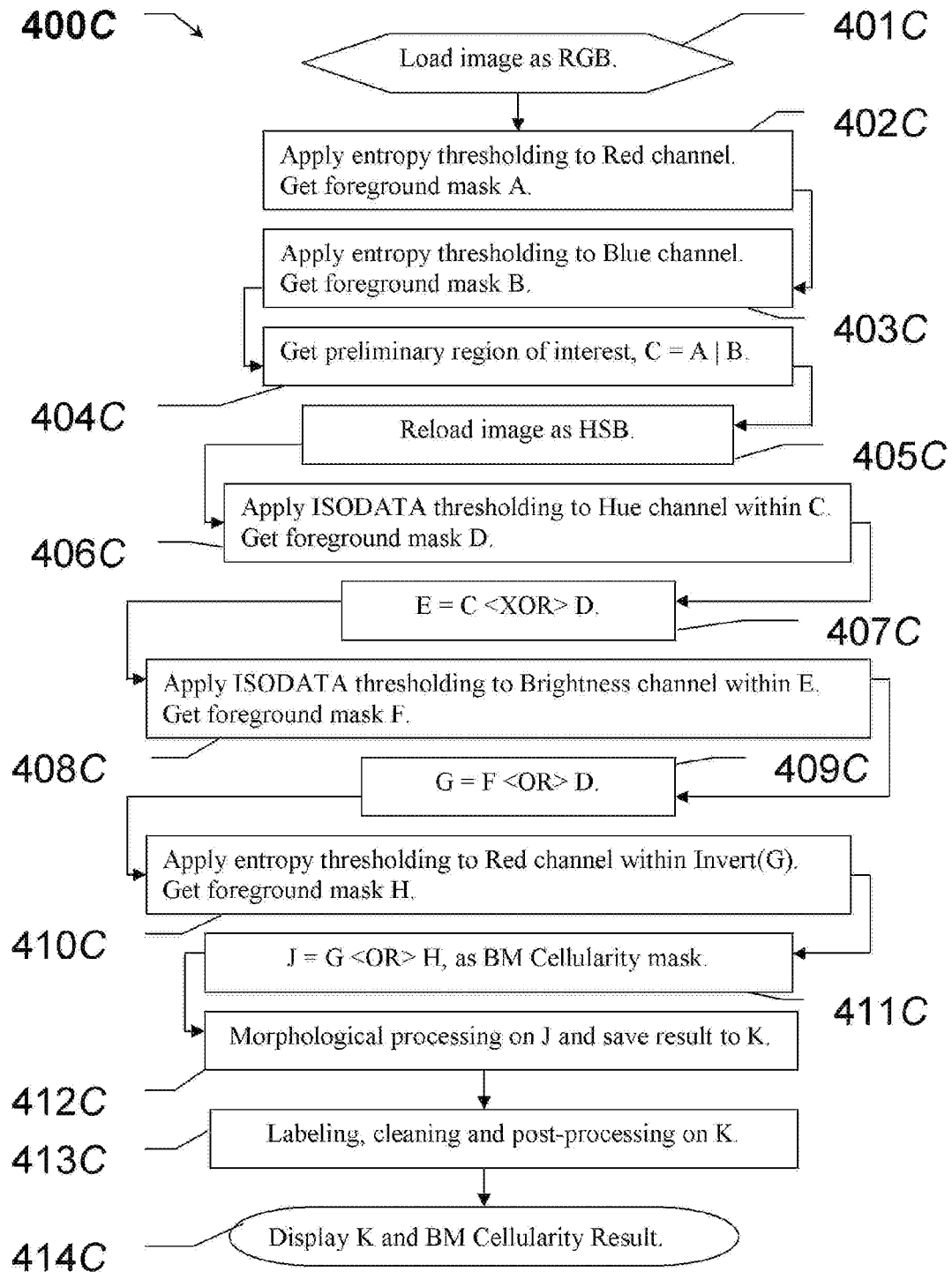
FIG. 4C shows the exemplary flowchart of the novel software algorithm intended to determine the cellularity, in an automated fashion, of the bone marrow tissue targeting the whole cells.

Referring now to FIG. 4C, depicted is an example of a method 400C that can be employed, in an automated fashion, such as in operation 403A to segment bone marrow cellularity of image data, such as shown at FIG. 3. Method 400C is an image data processing and analyzing algorithm which can be implemented as either computer hardware or software or a combination of both. Method 400C contains automated multi-stage image segmenting and morphological processing, numerical image data analyzing, and user interfacing.

At process 401C, an image subject to analysis is loaded into a computer memory separated into three distinct channels labeled as Red, Blue and Green channels.

At process 402C, entropy thresholding is applied to the image data using the Red channel pixels to segment foreground objects from the background and these foreground pixels are assigned to an intermediate mask labeled 'mask A'. As an example, objects in this mask represent all cells including cell nuclei that can be segmented from the background using an entropy threshold, using the gray level intensity threshold in the color channel being used. The gray level threshold can be employed for selecting objects within range of intensity levels, such as determined based on intensity values just above the peak level in a distribution of the image data (e.g., from a histogram) in the color channel being used.

At process 403C, entropy thresholding is applied to the image data using the Blue channel pixels to segment foreground objects from the background and these foreground pixels are assigned to an intermediate mask labeled 'mask B'.

At process 404C, 'mask A' and 'mask B' are combined using a logical <OR> operation and the result is assigned to an intermediate mask labeled as 'mask C'. 'Mask C' represents the preliminary region of interest for bone marrow cellularity and covers the nuclei over all the nonfat areas, as well as pale areas surrounding the nuclei.

At process 405C, Hue and Brightness channels are generated by either reloading sample image in HSB format or converting from existing RGB channels.

At process 406C, first the Hue channel is masked with 'mask C' and all pixels out of 'mask C' are removed. Then ISODATA thresholding is applied to the masked Hue channel pixels to segment foreground objects from the background and these foreground pixels are assigned to an intermediate mask labeled 'mask D'.

At process 407C, a logical <XOR> operation is applied to exclude 'mask D' region from 'mask C' and the result is saved in a intermediate mask labeled as 'mask E'.

At process 408C, first the Brightness channel is masked with 'mask E' and all pixels out of 'mask E' are removed. Then ISODATA thresholding is applied to the masked Brightness channel pixels to segment foreground objects from the background and these foreground pixels are assigned to an intermediate mask labeled 'mask F'.

At process 409C, 'mask D' and 'mask F' are combined using a logical <OR> operation and the result is assigned to an intermediate mask labeled as 'mask G'. 'Mask G' represents the primary region of interest for bone marrow cellularity and covers mainly the nuclei over all the nonfat areas.

At process 410C, first the Red channel is masked with 'mask G' and all pixels inside 'mask C' are removed. Then Entropy thresholding is applied to the masked Red channel pixels to segment foreground objects from the background and these foreground pixels are assigned to an intermediate mask labeled 'mask H'. A dynamic parameter epsilon as depicted in the succeeding embodiment of image processing method can be applied in selecting the entropy threshold. 'Mask H' covers minor nuclei areas missed in 'mask G'.

At process 411C, 'mask G' and 'mask H' are combined using a logical <OR> operation and the result is assigned to a bone marrow cellularity candidate mask labeled as 'mask J'. 'Mask J' represents the raw region of interest for bone marrow cellularity and covers the nuclei over all the nonfat areas.

At process 412C, morphological processing schemes such as Dilate and Erode are applied to shape the objects in 'mask J'. Tiny objects which are definitely out of interest are also removed from 'mask J' as a result of this procedure.

At process 413C, the segmented and morphologically shaped objects can be labeled to identify the respective objects relative to the background. For instance, segmented objects within the image can be labeled using a connected-components labeling algorithm, such as being described in Digital Image Processing, by Gonzalez R C, and Woods R E, Addison-Wesley Publishing Company Reading Mass., 1992. The threshold for the labeling can be fixed or it can be a user-selectable parameter that can be set according to application requirements. Thereafter the size (e.g., area of for two-dimensional objects) of each labeled object is calculated. Since additional objects, which may not correspond to cell nuclei or other objects of interest may also have been segmented and labeled from global thresholding, a cleaning procedure can be implemented on the labeled objects. The cleaning procedure can be implemented based on a priori information about the objects represented in the image data, such as may include one or more of the following object criteria: size of object, gray level intensity of object, and number of surrounding objects or local object density. The cleaning procedure can be fully or partially automated. For instance, an object that meet object criteria designed for removing the object can be either automatically removed or, alternatively, a user can be prompted (e.g., by a graphical user interface ('GUI')) to remove or keep the object. Additionally, a user can manually implement cleaning of objects, such as by selection of such objects via a corresponding user input device.

At process 414C, number of pixels are counted in 'mask K', and divide it by total pixels in the original sample image. 'Mask K' with bone marrow cellularity result is displayed, such as depicted in FIG. 5C and FIG. 5D.

Figure 4D:
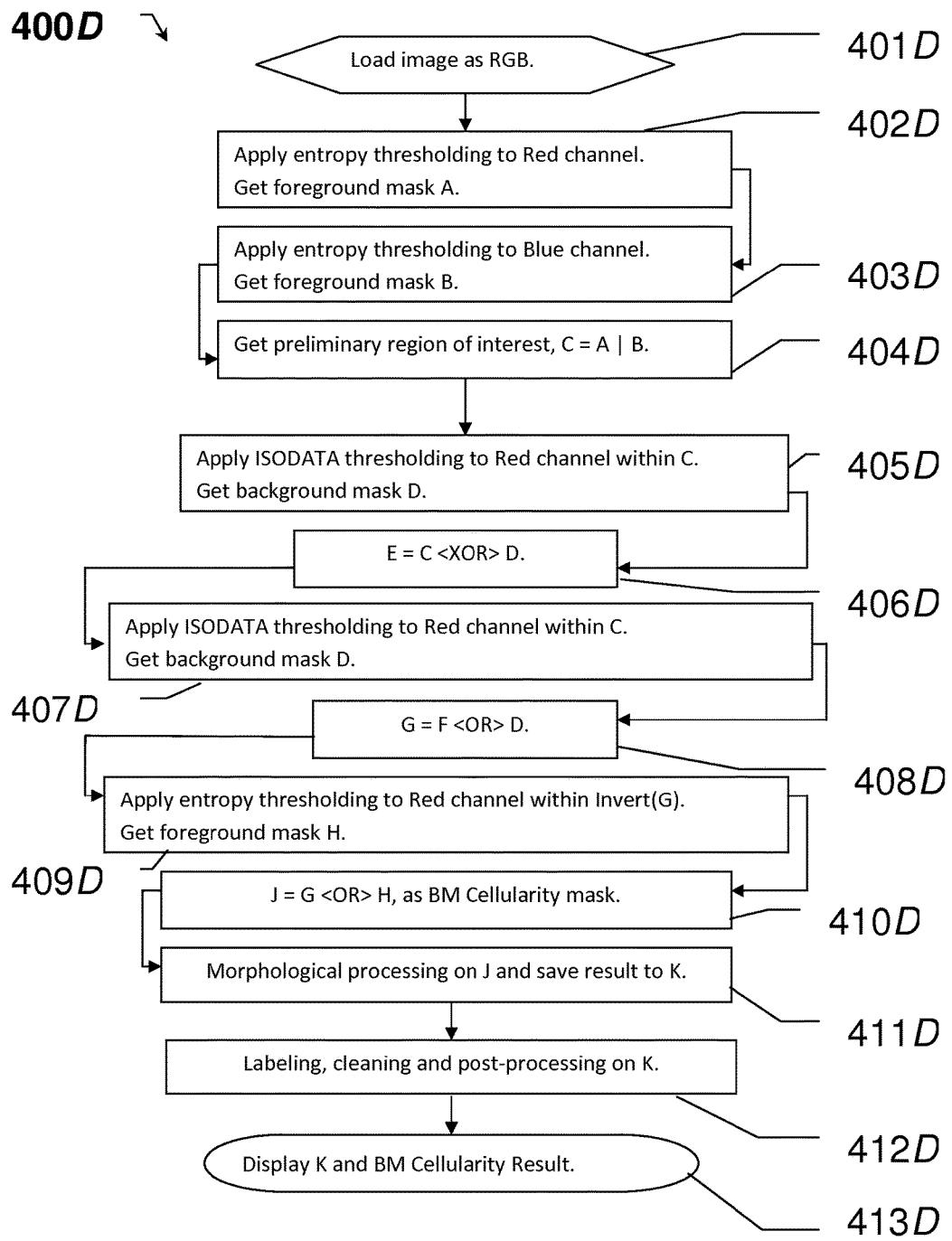
FIG. 4D shows the exemplary flowchart of the novel software algorithm intended to determine the cellularity, in an automated fashion, of the bone marrow tissue without using HSB.

Referring now to FIG. 4D, depicted is an example of a method 400D that can be exemplarily employed, in automated fashion, such as in operation 402A to segment bone marrow cellularity of image data, such as shown at FIG. 3. Method 400D is an image data processing and analyzing algorithm which can be implemented as either computer hardware or software or a combination of both. Method 400D contains automated multi-stage image segmenting and morphological processing, numerical image data analyzing, and user interfacing. This method processes image in RGB format and does not convert image data to HSB.

At process 401D, an image subject to analysis is loaded into a computer memory separated into three distinct channels labeled as Red, Blue and Green channels.

At process 402D, entropy thresholding is applied to the image data using the Red channel pixels to segment foreground objects from the background and these foreground pixels are assigned to an intermediate mask labeled 'mask A'. As an example, objects in this mask represent all cells including cell nuclei that can be segmented from the background using an entropy threshold, using the gray level intensity threshold in the color channel being used. The gray level threshold can be employed for selecting objects within range of intensity levels, such as determined based on intensity values just above the peak level in a distribution of the image data (e.g., from a histogram) in the color channel being used.

At process 403D, entropy thresholding is applied to the image data using the Blue channel pixels to segment foreground objects from the background and these foreground pixels are assigned to an intermediate mask labeled 'mask B'.

At process 404D, 'mask A' and 'mask B' are combined using a logical <OR> operation and the result is assigned to an intermediate mask labeled as 'mask C'. 'Mask C' represents the preliminary region of interest for bone marrow cellularity and covers the nuclei over all the nonfat areas, as well as pale areas surrounding the nuclei.

At process 405D, first, the Red channel is masked with 'mask C', and all pixels out of 'mask C' are removed. Then ISODATA thresholding is applied to the masked Red channel pixels to segment background objects from the foreground and these background pixels are assigned to an intermediate mask labeled 'mask D'. The Red channel gray level can be normalized in accordance with pixel intensity before the ISODATA thresholding.

At process 406D, a logical <XOR> operation is applied to exclude 'mask D' region from 'mask C', and the result is saved in a intermediate mask labeled as 'mask E'.

At process 407D, first, the Green channel is masked with 'mask E', and all pixels out of 'mask E' are removed. Then, ISODATA thresholding is applied to the masked Green channel pixels to segment foreground objects from the background and these foreground pixels are assigned to an intermediate mask labeled 'mask F'.

At process 408D, 'mask D' and 'mask F' are combined using a logical <OR> operation and the result is assigned to an intermediate mask labeled as 'mask G'. 'Mask G' represents the primary region of interest for bone marrow cellularity and covers mainly the nuclei over all the nonfat areas.

At process 409D, first, the Red channel is masked with 'mask G', and all pixels inside 'mask G' are removed. Then, entropy thresholding is applied to the masked Red channel pixels to segment foreground objects from the background and these foreground pixels are assigned to an intermediate mask labeled 'mask H'. A dynamic parameter epsilon as depicted in the succeeding embodiment of image processing method can be applied in selecting the entropy threshold. 'Mask H' covers minor nuclei areas missed in 'mask G'.

At process 410D, 'mask G' and 'mask H' are combined using a logical <OR> operation, and the result is assigned to an bone marrow cellularity candidate mask labeled as 'mask J'. 'Mask J' represents the raw region of interest for bone marrow cellularity and covers the nuclei over all the nonfat areas.

At process 411D, morphological processing schemes such as Dilate and Erode are applied to shape the objects in 'mask J'. Tiny objects which are definitely out of interest are also removed from 'mask J' as a result of this procedure.

At process 412D, the segmented and morphologically shaped objects can be labeled to identify the respective objects relative to the background. For instance, segmented objects within the image can be labeled using a connected-components labeling algorithm, such as being described in Digital Image Processing, by Gonzalez R C, and Woods R E, Addison-Wesley Publishing Company Reading Mass., 1992. The threshold for the labeling can be fixed or it can be a user-selectable parameter that can be set according to application requirements. Thereafter the size (e.g., area of for two-dimensional objects) of each labeled object is calculated. Since additional objects, which may not correspond to cell nuclei or other objects of interest may also have been segmented and labeled from global thresholding, a cleaning procedure can be implemented on the labeled objects. The cleaning procedure can be implemented based on a priori information about the objects represented in the image data, such as may include one or more of the following object criteria: size of object, gray level intensity of object, and number of surrounding objects or local object density. The cleaning procedure can be fully or partially automated. For instance, an object that meet object criteria designed for removing the object can be either automatically removed or, alternatively, a user can be prompted (e.g., by a graphical user interface ('GUI')) to remove or keep the object. Additionally, a user can manually implement cleaning of objects, such as by selection of such objects via a corresponding user input device.

At process 413D, number of pixels are counted in 'mask K', and divide it by total pixels in the original sample image. 'Mask K' with bone marrow cellularity result is displayed, such as depicted in FIG. 5C and FIG. 5D.

Figure 4E:
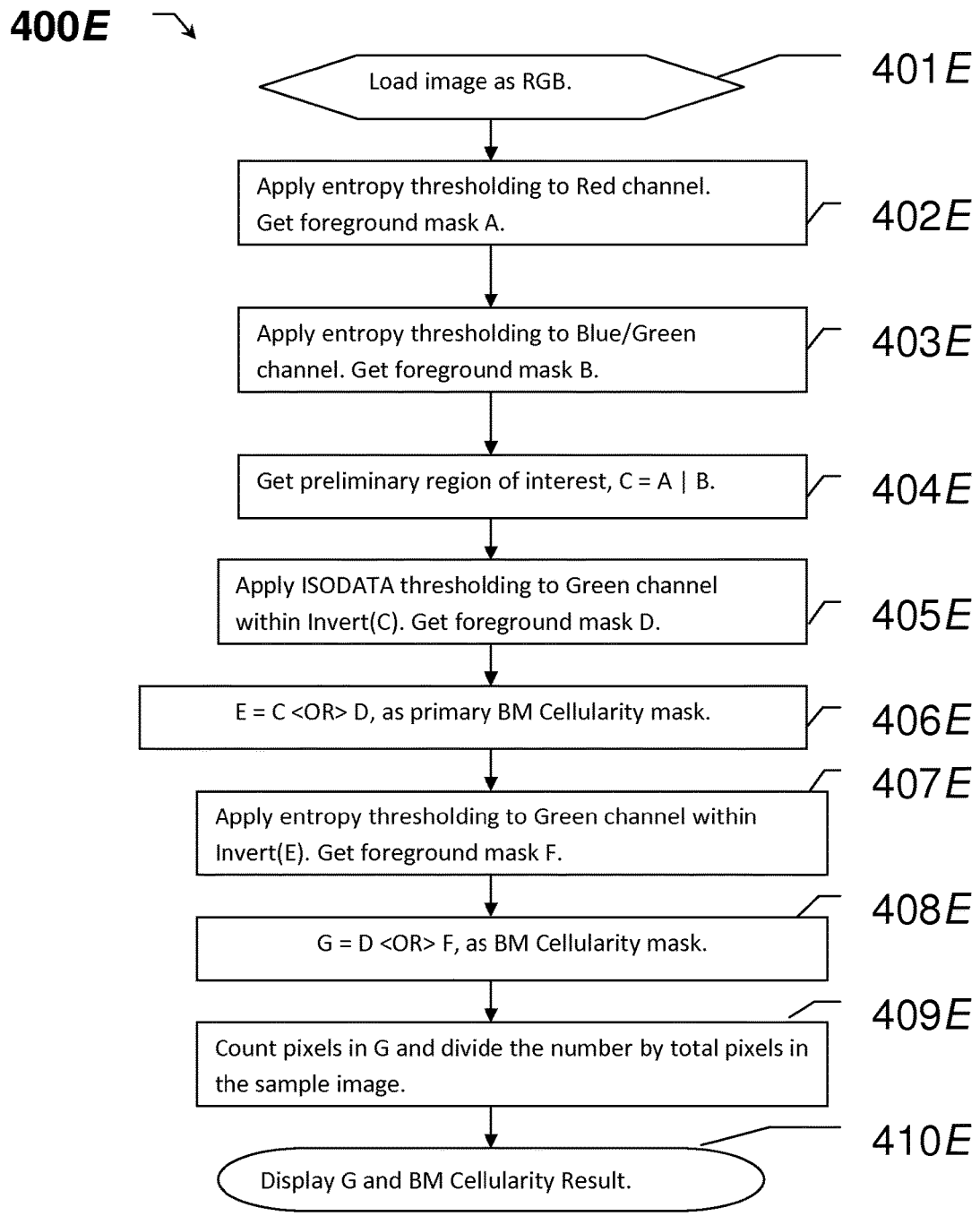
FIG. 4E shows the exemplary flowchart of the novel software algorithm intended to determine the cellularity, in an automated fashion, of the bone marrow tissue separating and counting negative and positive cells.

FIG. 4E depicts an example of a method 400E that can be exemplarily employed, in an automated fashion, such as in operation 402A to segment bone marrow cellularity of image data, such as shown at FIG. 3. Method 400E is an image data processing and analyzing algorithm which can be implemented as either computer hardware or software or a combination of both. Method 400E contains automated multi-stage image segmenting and morphological processing, numerical image data analyzing, and user interfacing. This method picks up the nuclei over all the nonfat areas as well as the surrounding pale spaces for bone marrow cellularity.

At process 401E, an image subject to analysis is loaded into a computer memory separated into three distinct channels labeled as Red, Blue and Green channels.

At process 402E, entropy thresholding is applied to the image data using the Red channel pixels to segment foreground objects from the background and these foreground pixels are assigned to an intermediate mask labeled 'mask A'. As an example, objects in this mask represent all cells including cell nuclei that can be segmented from the background using an entropy threshold, using the gray level intensity threshold in the color channel being used. The gray level threshold can be employed for selecting objects within range of intensity levels, such as determined based on intensity values just above the peak level in a distribution of the image data (e.g., from a histogram) in the color channel being used.

At process 403E, entropy thresholding is applied to the image data using the Blue channel pixels to segment foreground objects from the background and these foreground pixels are assigned to an intermediate mask labeled 'mask B'.

At process 404E, 'mask A' and 'mask B' are combined using a logical <OR> operation and the result is assigned to an intermediate mask labeled as 'mask C'. 'Mask C' represents the preliminary region of interest for bone marrow cellularity and covers the nuclei over all the nonfat areas, as well as pale areas surrounding the nuclei.

At process 405E, first, the Green channel is masked with 'mask C', and all pixels inside 'mask C' are removed. Then ISODATA thresholding is applied to the masked Green channel pixels to segment background objects from the foreground and these background pixels are assigned to an intermediate mask labeled 'mask D'.

At process 406E, 'mask C' and 'mask D' are combined using a logical <OR> operation and the result is assigned to an intermediate mask labeled as 'mask E'. 'Mask E' represents the primary region of interest for bone marrow cellularity.

At process 407E, first, the original Green channel is masked with 'mask E', and all pixels inside 'mask E' are removed. Then, entropy thresholding is applied to the masked Green channel pixels to segment foreground objects from the background and these foreground pixels are assigned to an intermediate mask labeled 'mask F'.

At process 408E, 'mask D' and 'mask F' are combined using a logical <OR> operation and the result is assigned to an intermediate mask labeled as 'mask G'. A dynamic parameter epsilon as depicted in the succeeding embodiment of image processing method can be applied in selecting the entropy threshold. 'Mask G' represents the region of interest for bone marrow cellularity and covers the nuclei over all the nonfat areas as well as surrounding pale spaces.

At process 409E, number of pixels are counted in 'mask G', and divide it by total pixels in the original sample image. Other numerical data analysis can be applied in accordance with users' requirement.

At process 410E, 'Mask G' with bone marrow cellularity result is displayed, such as depicted in FIG. 5C and FIG. 5D.

In methods 400B, 400C, 400D and 400E, ISODATA and entropy thresholdings are largely exchangeable and can reach similar results by adjusting parameters.

In addition, the definitions of the terms background and foreground are relative. In either ISODATA or entropy thresholding an image region is said to be composed of background pixels and foreground pixels. When objects are segmented out as foreground pixels from thresholding the rest in the image region are then said to be background pixels.

Referring to FIGS. 5A, 5B, 5C, and 5D, illustrated are the raw images of bone marrow and corresponding cellularity results implemented by the present invention. Bone marrow cellularity determination is a routine procedure in pathology examination of a bone marrow biopsy. A tissue from bone marrow is often obtained by a doctor or a physician assistant from either the hip bone or the sternum. Its cellularity defined as the amount of cells in relation the fat content is a variable number. The normal range is related to the site, the patient age, technical factors. Cellularity of twenty-five percent (25%) to seventy-five percent (75%) is usually normal is patient twenty (20) to seventy (70) years of age. The usual mode of assessment is by visual estimate when viewed under the microscope and this procedure is subjective and its accuracy related to the skill level of the viewer.

A more objective assessment is using image analysis, of which there is no prevailing currently available system to perform this function. In this mode, it is necessary to extract the image by first scanning using system as describe in the materials and methodology of FIG. 2 and FIG. 3. After the bone marrow is processed in histology by section the bone marrow tissue using a tissue microtome knife and attaching this section to the microscopic slide 302, the cells and fat are made visible by histology stains, most commonly used are either hematoxylin and eosin(H&E) and Periodic Acid Schiff (PAS) reagents.

In FIG. 5A and FIG. 5C are the raw color images of bone marrow digitally scanned from tissue 301 from exemplary two patients identified by ID 303. The microscopic image is obtained via a system that include a microscope 201, a color CCD camera 202, a general purpose computer or PC 203 equipped with a special purpose image processing board, and an output device 204 such as graphics monitor which may have a connection to printer for producing hard output. FIG. 5A is of a lower cellularity value than that of FIG. 5C. The cellularity is estimated visually but the invention extracts the objective cellularity results with the percentage of cell over total area shown in the results attached to the images. While FIG. 5B and FIG. 5D correspond to the digitized overlay of the image analysis ready for user or viewer approval.

Figure 5E:
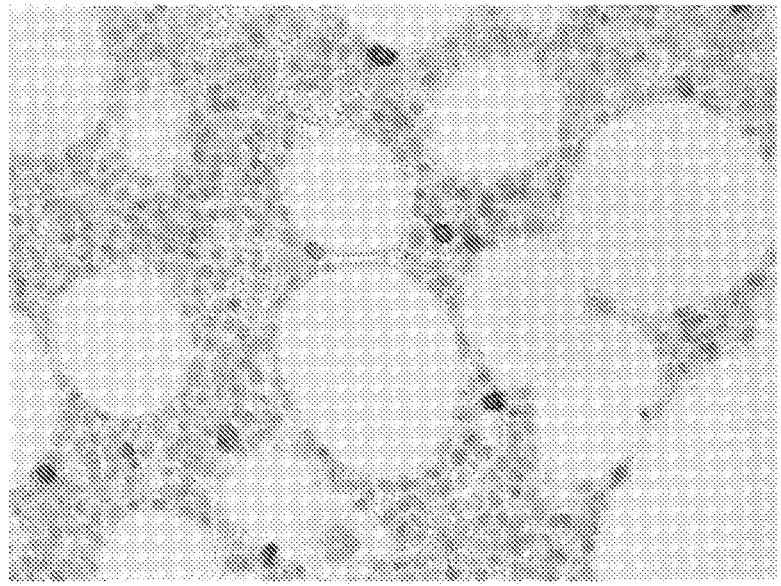
FIG. 5E shows the raw tissue image of a bone marrow cytologically and immunologically stained with hematoxylin and immunohistochemistry, respectively.

Referring now to FIGS. 5E, 5F, 5G, 5H, and 5I, illustrated are the images of bone marrow specially stained using Hematoxylin and immunohistochemistry stain. In this example, an immunohistochemistry stain using an antibody against a protein detecting a biomarker to B cells is used. The antibody is tagged with a brown color or dye and the cells carrying the biomarker are tagged as brown colored cells. The untagged cells appear as gray blue belonging to the other cells of the bone marrow belonging to the hematopoieitic class of cells. In FIG. 5E, the cells of the bone marrow are delineated from fat. The fat cells are the circular clear areas in between the cells. The cells are closely linked together to form a solid tissue mass. While FIG. 5F displays the bone marrow cellularity result from the invention image analysis algorithm procedure. The user is shown this image for verification.

In FIG. 5A and FIG. 5B are the raw color images of bone marrow digitally scanned from tissue 301 from exemplary two patients identified by ID 303. The microscopic image is obtained via a system that include a microscope 201, a color CCD camera 202, a general purpose computer or PC 204 equipped with a special purpose image processing board, and an output device 203 such as graphics monitor which may have a connection to printer for producing hard output. FIG. 5A is of a lower cellularity value than that of FIG. 5B. The cellularity is estimated visually but the invention extracts the objective cellularity results with the percentage of cell over total area shown in the results attached to the images. While FIG. 5C and FIG. 5D correspond to the digitized overlay of the image analysis ready for user or viewer approval.

The memory locations holding the three color channels are accessed and the monochromatic images of red, blue, and green channels are processed. In this preprocessing mode, the preferred embodiment for a brown stained cell is the blue monochromatic channel image and the red channel image is used for blue and brown stained cells. These are preprocessing by hardware enhancement.

Next, thresholding the foreground and background mask by entropy mode employs the epsilon parameter is performed on the green and red channels. Thresholding on the RGB spaces yields the separated objects without using conversion or transformation to H S I color spaces. The entropy with epsilon parameter allows predetermining the amount of objects to include in the thresholded pixels, i.e., for both blue and brown cell objects, an entropy mode with a parameter of 0.1 only includes 10% of the object location over the span of 255 range of the gray scale pixel distribution selecting for the foreground objects. The formula for using thresholding by entropy mode with parameter is shown below, with 'channel A' depicted by pixels thresholded by non-parameterized entropy mode using one predetermined monochromatic 'channel B' depicted by pixels thresholded by non-parameterized entropy mode using the sum of the pixels of predetermined monochromatic 'channel A' added together with pixels from another predetermined monochromatic 'channel B'.

$$\xi = \left(\frac{\Sigma A(1 \rightarrow n)}{\Sigma A + B(1 \rightarrow n)}\right)(0.49)$$

Figure 5F:
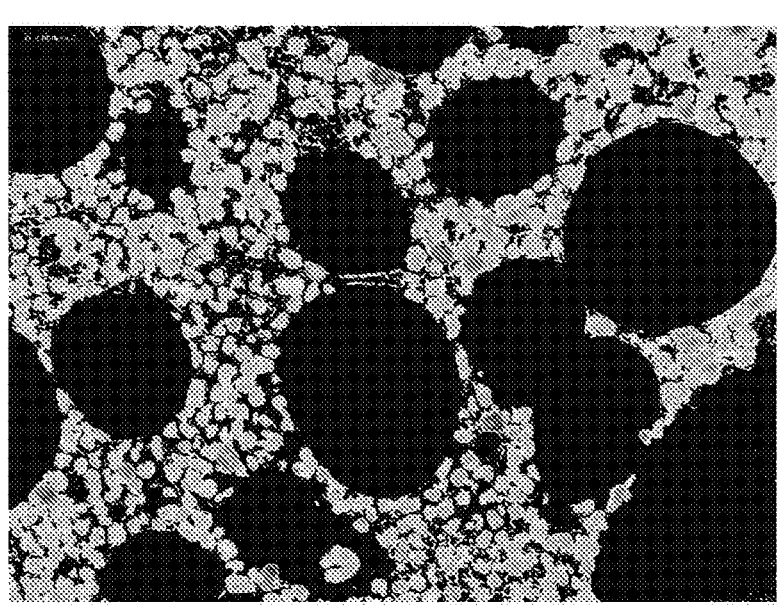
FIG. 5F shows the corresponding cellularity result provided by the automated analysis of FIG. 5E.

The blue channel is examined first by a histogram thresholding mode known in the art as isodata to maximally obtain the bitplane representing brown colored cell objects. The red channel is examined next by isodata mode and the resulting bitplane representing the blue and brown colored cell objects are obtained. Next, the results of these thresholding operations will produce the bitplanes for the brown objects and the blue objects as well the objects with both the brown and the blue. These two bitplanes are combined in a binary OR operation to yield the bitplane corresponding to the total bone marrow cellularity intermediate mask objects as displayed in FIG. 5F. For the benefit and for feedback from human operator, result is displayed as color images by overlaying these bitplanes the original color image. FIG. 5F show these cells as thresholded by the preceding steps showing both the brown and the blue single cells in a single frame with the total pixels of the objects displayed a the bone marrow cellularity.

Figure 5G:
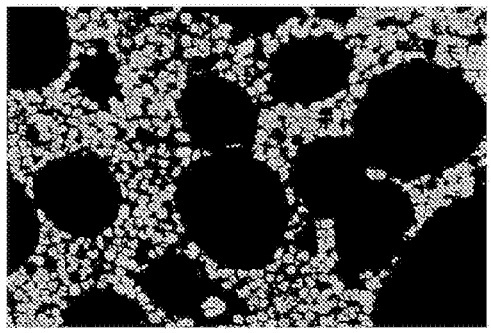
FIG. 5G and FIG. 5H show the negative and positive cells of the FIG. 5F, respectively.
Figure 5H:
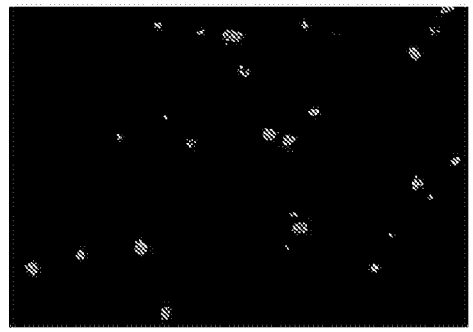

Next, the brown stained objects representing the immunohistochemistry tagged cells are separated as distinct cell objects of the same class from the non-tagged bone marrow cells yielding FIG. 5G result. The display show the non tagged or negative cells visible by coloration using the hematoxylin counter stain as bluish gray. In FIG. 5H, the tagged cells are called positive cells and visible as brown because of the brown dye (called Diaminobenzidine) tagged to the marker antibody molecule. This procedure is well known in the art as immunohistochemistry. The positive cells are then analyzed for chromogen density by summing up the average optical density The cells objects are labeled, their properties including size and pixel content along with their stain density data per cell in both negative and positive cell objects are then stored in computer memory for later display.

The objects corresponding to the actual biological cells are identified morphologically using a predetermined size of at least 12 microns in circular diameter and translated correspondingly to a predetermined area size of about 60 pixels. Next, larger objects than this cut off size are further processed known in the art as morphologic operations such as erosion and dilation, and the results of cell objects satisfying the criteria are then stored in memory for eventual data analysis.

Figure 5I:
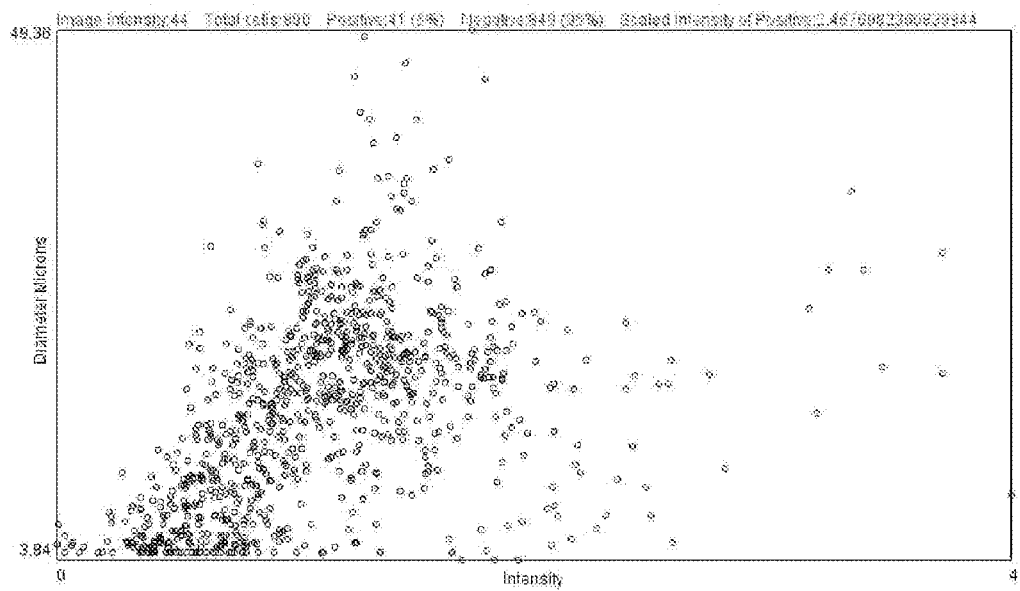
FIG. 5I shows quantitative dot plot display of the intensity distributions and percentage results of the negative and positive cells illustrated in FIG. 5G and FIG. 5H, respectively.

Moreover, FIG. 5G shows untagged cells individually counted and labeled as bone marrow component cells of the hematopoietic class and is referred to as negative cells. FIG. 5H shows the separated cells that are tagged by the immunostain biomarker for B cells and are clearly separated and countable by the machine algorithm. FIG. 5I shows the graphical output of the analysis of the image of FIG. 5E displaying the total positive, total negative, the intensity of staining of total and of the positive cells; the latter arrayed on the X axis and the relative size of the counted cells displayed as microns diameters on the Y axis. In this way, an objective result is obtained where a person ordinarily skilled in the art would have not difficulty understanding and implementing the said procedure.

Figure 4F:
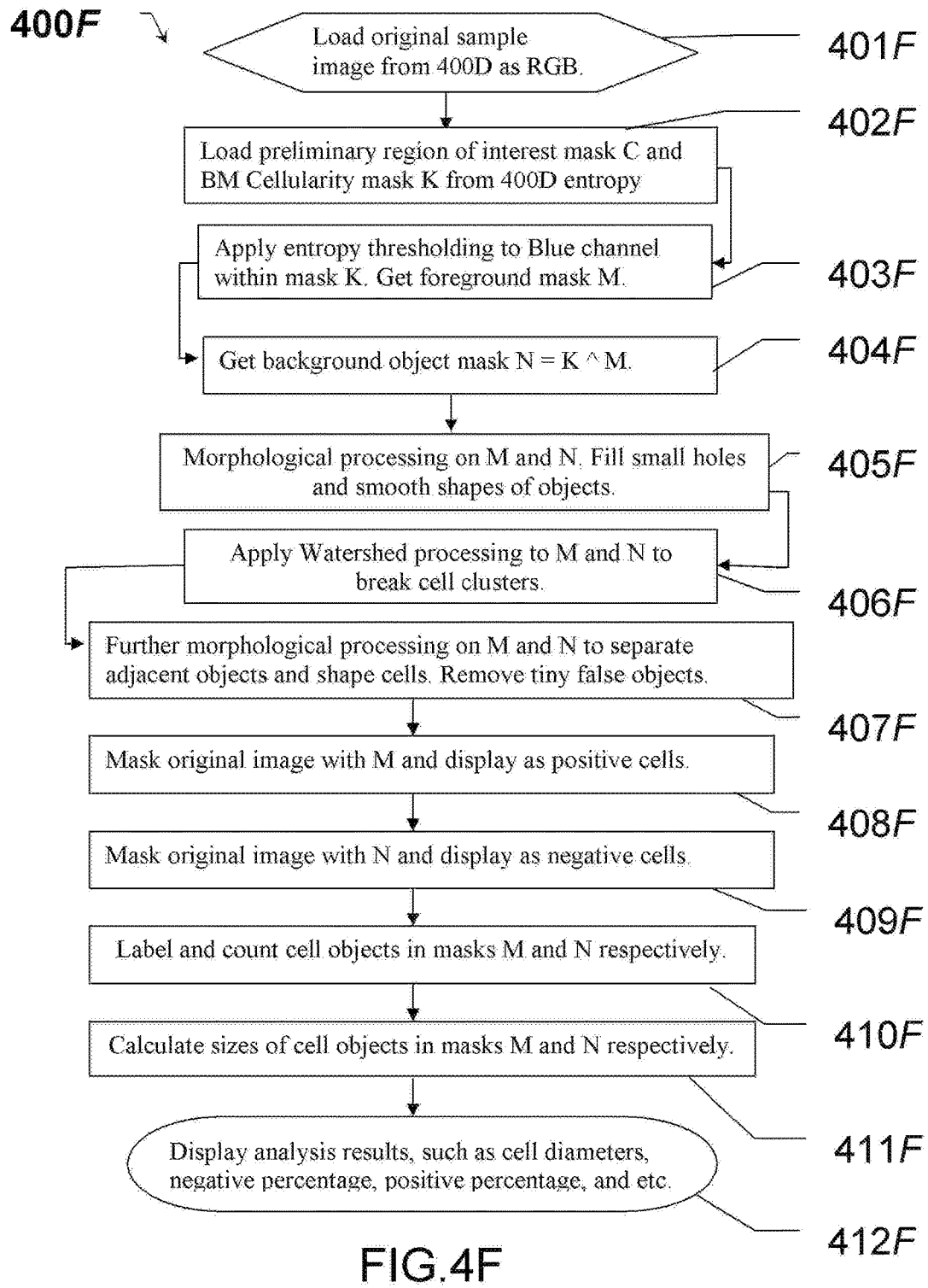
FIG. 4F shows the exemplary flowchart of the novel software algorithm intended to display virtual cytometry results either alone or in conjunction with one of the algorithms displayed in FIG. 4B, 4C, 4D or 4E.

Referring now to FIG. 4F, depicted is an example of a method 400F that can be employed following a bone marrow segmentation method, such as 400C, to separate and count negative and positive cells in sample image. By applying image processing and analysis algorithms, method 400F can display virtual flow cytometry results as shown in FIG. 5G, FIG. 5H, and FIG. 5I. Furthermore, method 400F can be implemented as either computer hardware or software or a combination of both, and can be implemented as a stand-alone program or a program combined with methods 400B, 400C, 400D or 400E. Method 400F contains automated image segmentation and morphological processing, numerical image data analyzing, and user interfacing.

At 401F, an image subject to analysis is loaded into computer memory separated into three distinct channels labeled as Red, Blue and Green channels.

Still at 402F, bone marrow segmentation 'mask K' and preliminary region of interest 'mask C', such as being generated in 400C, are loaded into computer memory.

At 403F, first, the Blue channel is masked with 'mask K', and all pixels out of 'mask K' are removed. Then Entropy thresholding is applied to the masked Blue channel pixels to segment foreground objects from the background and these foreground pixels are assigned to a mask labeled 'mask M'. A dynamic parameter epsilon can be applied in selecting the entropy threshold.

At 404F, a logical <XOR> operation is applied to exclude 'mask M' region from 'mask K' and the result is saved in a mask labeled as 'mask N'. 'Mask N' covers background pixels from 403F.

At 405F, morphological processing schemes such as Dilate and Erode are applied to shape the objects in masks M and N. Dilate is applied first followed by Dilate. As a result, tiny holes inside the objects in M and N are filled.

At 406F, Watershed processing is applied to masks M and N, respectively, so as to break clusters of grouped cells in M and N into individual cell objects.

At 407F, further morphological processing on masks M and N are used to separate adjacent objects and shape cells. Tiny false objects are also removed as a result of this step.

At 408F, the original image with 'mask M' is masked and the result is displayed as all positive cells, such as in FIG. 5H.

At 409F, the original image with 'mask N' is masked and the result is diaplayed as all negative cells, such as in FIG. 5G.

At 410F, cell objects are labeled and counted in 'mask M' and 'mask N', respectively.

At 411F, sizes of cell objects are calculated in 'mask M' and 'mask N', respectively.

At 412F, numerical analysis results are displayed, including cell diameters, negative percentage, positive percentage, averaged image intensity, scaled intensity of positive, and etc.

Figure 6:
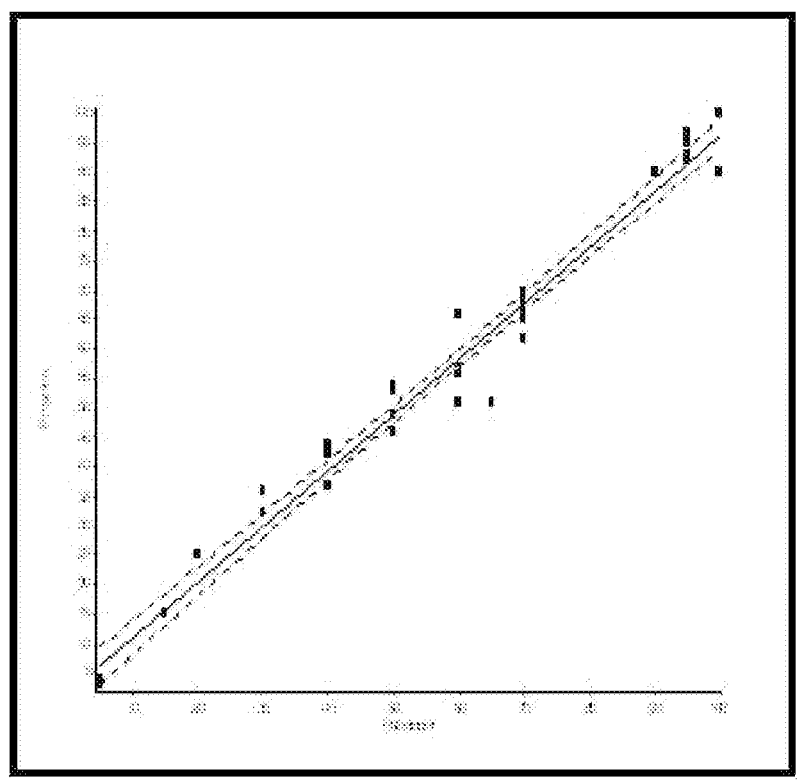
FIG. 6 shows the correlative data of bone marrow cellularity acquired between human operator estimate and computer program results.

Referring to FIG. 6, apparently illustrated is a graph containing correlative data of the bone marrow cellularity between human operator estimate and computer program results. The procedure used a Pearson parametric correlation using both X and Y values that are sampled from populations that follow a Gaussian distribution, at least approximately and this analysis is followed by linear regression to find the confidence interval and best fit. Copyright 1992-1998 GraphPad Software Inc. (www.graphpad.com).

Still referring to FIG. 6, quantifiably employed are the following numerical values of associated parameters:

| Parameter | Value |
| --- | --- |
| Number of points | 37 |
| Correlation coefficient (r) | 0.9866 |
| 95% confidence interval: | 0.9740 to 0.9932 |
| Coefficient of determination (r squared) | 0.9735 |

Using above parameters, it is objectively determined that the two-tailed P value is <0.0001, which is considered extremely significant. Linear regression and correlation are both applied. Linear regression finds the line that best predicts Y from X. Correlation quantifies how well X and Y vary together. Linear regression finds the best line that predicts Y from X by minimizing the sum of the square of the vertical distances of the points from the regression line. In this case, it makes sense to perform both regression and correlation to obtain maximum information. InStat is the program used to perform the calculations-GraphPad Software Inc. (www.graphpad.com)

Nine out of ten cases examined demonstrated 100% accuracy in determinating cellularity using the image analysis software of the preferred embodiment. The correlation coefficient of pathologist and Bone Marrow Cytometer using linear regression (Instat Graphpad) is r=0.98, p<0.0001 with four outliers in 37 cases. Initial problematic images, hypo and hypercellular marrows, are resolved with nuclear segmentation in the hypocellular marrows and accurate nuclear and cytoplasmic segmentation in the hypercellular marrows. The hypocellular marrow at day 14 post chemotherapy was segmented excluding the serous stroma and extracted nucleated cells only.

Image Processing Method

The invention uses multiple layers of processing. As image data passes through various stages, with each stage applying bitplane sculpting for thresholding providing finer and finer discrimination of objects from non objects. The method uses a novel multi-stage thresholding and segmentation algorithm based on multiple color channels in RGB and HS I spaces. The algorithm uses auto-thresholding on red and blue channels in RGB to get the raw working image of all cells, and then refines the working image with thresholding on hue and intensity channels in HS I, and further separates different classes of cells by auto-thresholding within the working image region.

The initial steps of the invention involves looking at a procedure involving steps with human input and human reference for the "ground truth" that does so using a microscope means by user or pathologist either looking under the objective lenses or by referring to image in the display monitor after focusing the microscope and adjusting for the optimum light setting, this subject treated more below. In one embodiment of the invention, the computer system processes a 20.times. Magnification field of view (FOV) to be displayed after processing in CCD camera.

As some control is necessary to avoid camera saturation, or inadequate exposure in any one of the color bands, balancing is performed automatically by utilizing a white light calibration by obtaining first an image of clear slide in location without blemish or without tissue and using the software for setting the white balance before human operator starts using this system. In addition to setting the light balance, a preferred embodiment is for setting a positive chromogen calibrator for stain density to be scanned. The calibrator is located alongside the tissue on slide to be used to plot a standard linearity graph performed by the alternative module in software. The graph is based on a predetermined antigen density corresponding to 1+ to 4+ ranges. These calibrator images per slide are stored as a lookup table. Alternatively, by automated scanning means, the calibration is performed beforehand using an automated slide delivery and imaging system. The system description is beyond the scope of this invention but is preferably one like the Vision Biosystem SL50.

The image scanning begins by providing for a plurality of scanned images from the microscope. A preferred embodiment includes a software module with calibrated brightness filter to get the optimum light exposure. The human operator or the automated delivery system has to also set the optimal transmitted lighting using a rheostat mechanism controllable to a predetermined range of brightness. In one embodiment, the brightness is set using an Olympus microscope equipped with a 30-watt halogen light source and a range of setting from 1 to 10, to a range between 5.5 to 6.5 on the dial. This setting is optimal even though image analysis on test systems was stable with a rheostat setting from 4.0 to 7.0. We also found that image analysis results are stable even without a blue 80A Tiffen filter, when the condenser is down, or when the light bulb is just replaced with a new one. In those extreme settings, the whole image goes from yellowish saturation to bluish saturation from low to high number of rheostat respectively. Because of the robust automation that adjusts to the feature inherent in the image, the results are noted to be accurate despite the brightness variation in contrast to prior art results which are exquisitely sensitive to brightness variance. Preferably, our algorithm has, outside this predetermined range of light intensity, a trigger for an error signal or prompt for correct adjustment.

A typical imaging system may use an incandescent halogen light bulb as a light source. As the bulb ages, the relative amounts of red and blue output can change. The tendency as the bulb ages is for the blue to drop off more than the red and the green. To accommodate for this light source variation over time, white balancing process as described above. The brightness of an image is provided by histogram function determines how many pixels within a gray scale FOV have a certain image intensity and cut off values of too dark or too bright are predetermined to warn the user of suboptimal lighting of the images. This procedure is preferably using a wide range of 120 and 230 as brightness cutoff over a range of 256, of low and high end respectively. The optical density of the total pixel of the grabbed image are summed up and averaged to give the mean brightness. The total pixel number is divided by the mean brightness to give the total average frame brightness. This value is used as the cutoff.

Next, the pixels of the filtered above image are dynamically thresholded to determine the presence of one or more regions of connected pixels having the same color. The dynamic thresholding using the entropy mode, unlike many algorithm in prior art, is very important in the invention in as much as the method relies on the distribution of the hue and intensity values and the algorithm adjust for images that are less than optimal, too dark or too light. To separate objects of interest, the thresholding operation is performed designed to set pixels within cells of interest to a value of 1, and all other areas to 0. Thresholding ideally yields an image in which cells of interest are white and the remainder of the image is black. A problem one faces in thresholding is where to set the threshold level. One cannot simply assume that cells of interest are indicated by any pixel value above the nominal threshold of 128. The objects in the field of view undergo a preprocessing test using threshold to determine whether the brightness of the object lies within a predetermined range. In this mode, thresholding is a doublet process again using both the hue and intensity image planes.

The hue and intensity planes are thresholded using an automated histogram thresholding mode entropy. The entropy mode use a dynamic parameter epsilon to allow for only a fraction of the hue and intensity detected objects to be segmented as objects and this parameter also relies on the frequency distribution of hue and intensity. This mode is adaptable to the day to day cell staining variation. This mode uses image to image math. The result of calculation of two image frames using first the bitplane mask from blue channel divided by the total mask from both the blue and the red channel combined using binary OR. This number is a fraction that is proportional to the entropy mode fractional parameter. The image math result of above is delimited by multiplying with 0.45 and the resulting product is equal to the epsilon. We have observed that this fraction encapsulates the proportional staining of the dark brown objects over the blue objects. This adaptation is a further advantage of this technique over prior art.

In other words, the epsilon is directly related to the output of the red and blue channel thresholding operations, the epsilon encapsulates the highlighted objects both in hue and intensity from the blue channel which happens to be the brown stained cells including its brownish-blue nuclei. Since the epsilon is related to the actual image and its inherent property, epsilon encapsulates the invariant factor which is a novel feature of the invention.

A morphological closing residue operation known in the art is applied to determine separation boundaries. A separation boundary is subtracted from the hole-filled image to create an overlap of object separated binary image. To ensure that no objects have been lost in this process, the overlap object separated image is dilated to generate an object mask. Small objects not included in the object mask are combined in a set union with the object separation image to provide an object recovered image.

The operator is provided with an option to configure the system to perform any or all of these steps and whether to perform certain steps more than once or several times in a row. The sequence of steps can be varied and thereby optimized for specific reagents or reagent combinations; however, the sequence described herein is preferred. Since the operator or user or pathologist is an indispensable cog in the wheel of this invention, a high correlation with the pathologist manual or visual estimate results when presented with a certain image frame is a prerequisite for the usefulness criterion. The result of this correlation is presented in the appendix.

Computer Implementation

Components of the invention may be realized in hardware or software, or a combination of both. However, preferably, the algorithms and methods of the invention are implemented in one or more processor programs executing on programmable computers each comprising at least one processor of either Intel or Motorola type, at least one data storage system (including volatile and non-volatile memory and/or storage elements), at least one input device, and at least one output device. Program code(s) applied to input data may perform the functions described herein to generate desired output information. The output information is applied to one or more output devices, in known fashion but preferably either an Excel compatible format or a graphics plot showing the distribution of cells based on size vs. the chromogen or dye density. Each program may be implemented in any desired computer language preferably with high level image processing functions (including machine, assembly, high level procedural, or object oriented programming languages) to communicate with a computer system. In any case, the language may be a compiled or interpreted language or both. Each such computer program is preferably stored on a storage media or device (e.g., ROM, CD-ROM, DVD, tape, or magnetic diskette) readable by a general or special purpose programmable computer, for configuring and operating the computer when the storage media or device is read by the computer to perform the procedures described herein. The inventive system may also be considered to be realized as a computer-readable storage medium, or via an internet server medium and hardware configured with connectivity and said computer program, where the storage medium so configured causes a computer to operate in a specific and predefined manner to perform the functions described herein.

Additional Embodiments

There are a plurality of embodiments including a provision for three or more modules to include bone marrow immunohistochemistry with nuclear reactivity (FIGS. 5E-5I), membrane-cytoplasmic, small, large cell, medium size cells (FIG. 4D), polar golgi, granular staining, spindle shaped staining, global stromal pattern and others. Another embodiment is to display not size but other nuclear characteristics such as shape, texture, ferret diameter, contour, vs. intensity or vs. detected intranuclear moieties such as chromogenic or in situ hybridization signals.

Another preferred embodiment is the capability of the apparatus and method to be used in ordinary daily pathology practice setting where the diagnostic process of tissue biopsy is the priority. In this mode, the user has little time fiddling with controls of the system and therefore require a robust accommodating mode. In this embodiment, the system is made to dynamically accommodate a wide variation of microscope transmitted light intensity from 4.0 to 6.6 variable rheostat setting (0-10 range).

Another preferred embodiment is the capability of the invention to accommodate a variable immunohistochemical slide product performed by different automated immunohistochemistry machines specifically applied to bone marrow histologic tissue.

Another preferred embodiment is the capability of the invention to accommodate variable color substrates and dual or triple combinations, both as indicia marker or nuclear counter stain, to include not only brown and blue but a combination of red, orange, black, violet, and any other dark color with a lighter hue of any colored nuclear counter stain.

In one embodiment, examined for speed, a segmentation of a 512.times.474 RGB image and display of statistical results table or plot data result in a 12-15 seconds using a 100 MHz PowerPC CPU or faster in a Intel Celeron PC 1.4 GHZ using JAVA executed the method in 2-3 seconds.

The invention may be embodied in other forms than those specifically disclosed herein without departing from its spirit or essential characteristics. The described embodiments are to be considered in all respects as illustrative and not restrictive. The scope of the invention is commensurate with the appended claims and all equivalents rather than the foregoing description.

OBJECTS AND ADVANTAGES

Accordingly, the aforementioned prior art references pertaining to automated method for image analysis fails to provide a cell to fat ratio statistic applicable in the field of pathology, and/or disease or cancer diagnosis. Moreover, the present invention substantially differs from the previously mentioned prior art references, in both composition and method on how said purpose may be achieved and offers several advantageous features. To wit:

Firstly, use of routine diagnostic brightfield microscope with outfitted CCD RGB camera available in most pathologists or scientists office.

Secondly, use of routine bone marrow stains instead of specialized Optimal evaluation of these results are then rapidly visible and accessible for approval or system modification based on the actual visualized original tissue and cell distribution in the colored image.

Thirdly, use of an instantaneous color graphic display of bone marrow and fat segmentation with an overlay display of actual marrow image so that the results of segmentation is verifiable by the user.

Fourthly, use of a novel thresholding algorithm that dynamically adjust for staining and sectioning variabilities by using the novel epsilon parameter.

Fifthly, use of a novel thresholding algorithm that dynamically adjust for a wide range of light intensity of the transmitted light microscope by using the novel epsilon parameter.

Sixthly, use of the combination of the above to provide a new and improved apparatus and method that converts bone marrow cellularity analysis to objective results amenable to data analysis and display.

Our approach is advantageous than prior art because there is no need to use an expensive imaging spectrometer or spectral microscopes as one may approach the variable color segmentation problem. Moreover, there is also no need to identify pure color and measure color differences as colors are often mixed in tissue; brown is often with blue, and chromogen and dye bleed into each other as a rule. There is also no need to have a special light such as UV or confocal optics. An ordinary microscope with camera using brightfield microscopy is all that is needed for obtaining the images. In the preferred embodiment of the invention, colored component can be better analyzed if color is separated from the intensity component.

We claim:

1. An apparatus for determining the bone marrow cellularity percentage of a bone marrow tissue sample comprising:
   a digital camera to capture at least one digital image from said bone marrow tissue sample;
   an image processor coupled to said digital camera to receive and process at least one digital image from said digital camera;
   a computer coupled to said image processor to receive at least one processed digital image from said image processor;
   digital storage coupled to said computer to store said at least one processed digital image therefrom;
   a display coupled to said computer to display output from said computer;
   wherein said computer interacts with said image processor, said digital storage and said display to determine said bone marrow cellularity percentage by separating said at least one processed digital image into respective portions representing fat and non-fat cells, computing the relative areas occupied by each of said respective portions representing fat and non-fat cells, and computing and displaying the ratio therebetween.

2. The apparatus in claim 1 wherein the step of separating said at least one processed digital image into respective portions representing fat and non-fat cells comprises separating said at least one processed digital image into respective portions representing cells of at least hematopoietic and non-hematopoietic classes.

3. An apparatus for determining the bone marrow cellularity percentage of a bone marrow tissue sample comprising:
   a digital camera to capture at least one digital image from said bone marrow tissue sample;
   an image processor coupled to said digital camera to receive and process at least one digital image from said digital camera;
   a computer coupled to said image processor to receive at least one processed digital image from said image processor;
   digital storage coupled to said computer to store said at least one processed digital image therefrom;
   a display coupled to said computer to display output from said computer;
   wherein said computer interacts with said image processor, said digital storage and said display to analyze said at least one processed digital image and determine said bone marrow cellularity percentage by performing steps comprising:
   separating said at least one processed digital image into red, green, and blue channels representing the respective red, blue, and green values contained in said at least one processed digital image;
   separating said at least one processed digital image into hue, saturation, and brightness channels representing the respective hue, saturation and brightness values contained in said at least one processed digital image;
   applying dynamic entropy thresholding to each of said channels representing red and blue intensities to create red and blue entropy thresholded channels, respectively; combining said red and blue entropy thresholded channels using a logical OR operation to create a first nonfat cellular image;
   masking said hue channel with said first nonfat cellular image to create a second nonfat cellular image;
   applying ISODATA thresholding to said second nonfat cellular image to create an ISODATA-thresholded second nonfat cellular image;
   creating a third nonfat cellular image by applying a logical XOR operation to said ISODATA-thresholded second nonfat cellular image and said first nonfat cellular image;
   masking said brightness channel with said third nonfat cellular image to create a fourth nonfat cellular image;
   applying ISODATA thresholding to said fourth nonfat cellular image to create an ISODATA-thresholded fourth nonfat cellular image;
   combining said ISODATA-thresholded fourth nonfat cellular image and said ISODATA-thresholded second nonfat cellular image using a logical OR operation to create a fifth nonfat cellular image;

inverting said fifth nonfat cellular image to create an inverted fifth nonfat cellular image;

masking said blue entropy-thresholded channel with said inverted fifth nonfat cellular image to create a sixth nonfat cellular image;

applying entropy thresholding to said sixth nonfat cellular image to create an entropy-thresholded sixth nonfat cellular image;

combining said sixth nonfat cellular image and said fifth nonfat cellular image using a logical OR operation to create a cellularity mask;

counting nonzero pixels in said cellularity mask to create a cellularity count;

dividing said cellularity count by the total number of pixels in said processed digital image to create said bone marrow cellularity percentage; and displaying said bone marrow cellularity percentage on said display.

4. The apparatus of claim 3, further comprising the step of displaying said cellularity mask on said display.

5. The apparatus of claim 3, further comprising the steps of:

applying morphological processing to said cellularity mask to create a morphological cellularity mask;

counting nonzero pixels in said morphological cellularity mask to create a morphological cellularity count;

dividing said morphological cellularity count by the total number of pixels in said processed digital image to create a morphological bone marrow cellularity percentage; and displaying said morphological bone marrow cellularity percentage and said morphological cellularity mask on said display.

6. The apparatus of claim 4, further comprising the steps of applying morphological processing to said cellularity mask to create a morphological cellularity mask;

counting nonzero pixels in said morphological cellularity mask to create a morphological cellularity count;

dividing said morphological cellularity count by the total number of pixels in said processed digital image to create a morphological bone marrow cellularity percentage; and displaying said morphological bone marrow cellularity percentage and said morphological cellularity mask on said display.

* * * * *